US011961042B2

(12) United States Patent
Yu et al.

(10) Patent No.: US 11,961,042 B2
(45) Date of Patent: Apr. 16, 2024

(54) ROBOTIC SYSTEM WITH AUTOMATED PACKAGE REGISTRATION MECHANISM AND AUTO-DETECTION PIPELINE

(71) Applicant: MUJIN, Inc., Tokyo (JP)

(72) Inventors: Jinze Yu, Tokyo (JP); Jose Jeronimo Moreira Rodrigues, Tokyo (JP); Rosen Nikolaev Diankov, Tokyo (JP); Xutao Ye, Tokyo (JP); Russell Islam, Tokyo (JP)

(73) Assignee: MUJIN, Inc., Tokyo (JP)

( * ) Notice: Subject to any disclaimer, the term of this patent is extended or adjusted under 35 U.S.C. 154(b) by 24 days.

(21) Appl. No.: 17/527,012

(22) Filed: Nov. 15, 2021

(65) Prior Publication Data

US 2022/0076425 A1    Mar. 10, 2022

Related U.S. Application Data

(63) Continuation of application No. 16/667,840, filed on Oct. 29, 2019, now Pat. No. 11,189,033.

(Continued)

(51) Int. Cl.
*G06F 7/00* (2006.01)
*B25J 9/16* (2006.01)
(Continued)

(52) U.S. Cl.
CPC .......... *G06Q 10/087* (2013.01); *B25J 9/1676* (2013.01); *B25J 9/1687* (2013.01);
(Continued)

(58) Field of Classification Search
CPC ..... G06Q 10/087; B25J 9/1676; B25J 9/1687;
B25J 9/1697; B65B 43/46; B65G 61/00;
B65G 63/002; B65G 47/917; B65G 59/02; B65G 2814/031; B65G 2201/02;
G05B 19/40935; G05B 2219/40006;
(Continued)

(56) References Cited

U.S. PATENT DOCUMENTS 4,907,169 A    3/1990 Lovoi
5,812,395 A    9/1998 Mascianegelo et al.
(Continued)

FOREIGN PATENT DOCUMENTS

CN    1293752 A    5/2001
CN    1135201 C    1/2004
(Continued)

OTHER PUBLICATIONS

Non-Final Office Action dated Apr. 18, 2019 for U.S. Appl. No. 16/290,741, filed Mar. 1, 2019, 16 pages.
(Continued)

*Primary Examiner* — Yolanda R Cumbess
(74) *Attorney, Agent, or Firm* — Perkins Coie LLP

(57) ABSTRACT

The present disclosure relates to detecting and registering unrecognized or unregistered objects. A minimum viable range (MVR) may be derived based on inspecting image data that represents objects. The MVR may be determined to be a certain MVR or an uncertain MVR according to one or more features represented in the image data. The MVR may be used to register corresponding objects according to the certain or uncertain determination.

20 Claims, 12 Drawing Sheets

Related U.S. Application Data

(60) Provisional application No. 62/852,963, filed on May 24, 2019, provisional application No. 62/752,756, filed on Oct. 30, 2018.

(51) Int. Cl.

| | | |
|---|---|---|
| *B65B 43/46* | (2006.01) | |
| *B65G 61/00* | (2006.01) | |
| *G05B 19/4093* | (2006.01) | |
| *G06Q 10/087* | (2023.01) | |
| *G06T 7/11* | (2017.01) | |
| *G06T 7/13* | (2017.01) | |
| *G06T 7/50* | (2017.01) | |
| *G06T 7/62* | (2017.01) | |
| *G06T 7/73* | (2017.01) | |
| *G06T 19/20* | (2011.01) | |
| *G06V 10/20* | (2022.01) | |
| *G06V 10/25* | (2022.01) | |
| *G06V 20/64* | (2022.01) | |
| *G06V 10/44* | (2022.01) | |

(52) U.S. Cl.

CPC .............. *B25J 9/1697* (2013.01); *B65B 43/46* (2013.01); *B65G 61/00* (2013.01); *G05B 19/40935* (2013.01); *G06T 7/11* (2017.01); *G06T 7/13* (2017.01); *G06T 7/50* (2017.01); *G06T 7/62* (2017.01); *G06T 7/73* (2017.01); *G06T 19/20* (2013.01); *G06V 10/25* (2022.01); *G06V 10/255* (2022.01); *G06V 20/64* (2022.01); *G05B 2219/40006* (2013.01); *G05B 2219/40607* (2013.01); *G06T 2200/04* (2013.01); *G06T 2207/10028* (2013.01); *G06T 2207/20164* (2013.01); *G06T 2207/30108* (2013.01); *G06V 10/44* (2022.01)

(58) Field of Classification Search

CPC ... G05B 2219/40607; G06T 7/11; G06T 7/13; G06T 7/50; G06T 7/62; G06T 7/73; G06T 19/20; G06T 2200/04; G06T 2207/10028; G06T 2207/20164; G06T 2207/30108; G06T 2207/30021; G06T 2207/30164; G06T 7/001; G06T 7/12; G06T 7/174; G06V 10/25; G06V 10/255; G06V 20/64; G06V 10/44; G06V 2201/06

USPC .................. 700/213–215, 217, 221–222

See application file for complete search history.

(56) References Cited

U.S. PATENT DOCUMENTS

| | | | |
|---|---|---|---|
| 6,272,230 B1 * | 8/2001 | Hiraoglu | G06V 20/52 |
| | | | 250/363.04 |
| 6,290,454 B1 | 9/2001 | Huang et al. | |
| 7,085,622 B2 | 8/2006 | Sadighi et al. | |
| 7,646,917 B2 | 1/2010 | Jung et al. | |
| 8,571,298 B2 | 10/2013 | McQueen et al. | |
| 9,050,719 B2 | 6/2015 | Valpola et al. | |
| 9,067,744 B2 | 6/2015 | Takizawa et al. | |
| 9,102,055 B1 | 8/2015 | Konolige et al. | |
| 9,227,323 B1 | 1/2016 | Konolige et al. | |
| 9,233,470 B1 | 1/2016 | Bradski et al. | |
| 9,272,417 B2 | 3/2016 | Konolige et al. | |
| 9,327,406 B1 | 5/2016 | Hinterstoisser et al. | |
| 9,486,921 B1 | 11/2016 | Straszheim et al. | |
| 9,630,320 B1 | 4/2017 | Konolige et al. | |
| 9,630,321 B2 | 4/2017 | Bradski et al. | |
| 9,757,858 B2 | 9/2017 | Eto et al. | |
| 9,796,540 B1 | 10/2017 | Shellenbaum et al. | |
| 9,862,093 B2 | 1/2018 | Bradski et al. | |
| 10,124,489 B2 | 11/2018 | Chitta et al. | |
| 10,147,398 B2 | 12/2018 | Koga | |
| 10,328,578 B2 | 6/2019 | Holz | |
| 10,369,701 B1 | 8/2019 | Diankov et al. | |
| 10,471,597 B1 | 11/2019 | Murphy et al. | |
| 10,562,188 B1 | 2/2020 | Diankov et al. | |
| 10,562,189 B1 | 2/2020 | Diankov et al. | |
| 10,614,340 B1 | 4/2020 | Yu et al. | |
| 10,625,952 B1 | 4/2020 | Luthra et al. | |
| 10,703,584 B2 | 7/2020 | Diankov et al. | |
| 11,034,025 B2 | 6/2021 | Diankov et al. | |
| 11,062,457 B2 | 7/2021 | Yu et al. | |
| 11,068,679 B2 * | 7/2021 | Rodriguez | G06V 30/2247 |
| 11,189,033 B2 | 11/2021 | Yu et al. | |
| 11,288,810 B2 | 3/2022 | Diankov et al. | |
| 11,797,926 B2 | 10/2023 | Diankov et al. | |
| 2002/0106273 A1 | 8/2002 | Huang et al. | |
| 2007/0177011 A1 | 8/2007 | Lewin et al. | |
| 2007/0177790 A1 | 8/2007 | Ban et al. | |
| 2009/0028686 A1 | 1/2009 | Tallis et al. | |
| 2010/0004778 A1 | 1/2010 | Arimatsu et al. | |
| 2010/0082152 A1 | 4/2010 | Mishra et al. | |
| 2010/0222915 A1 | 9/2010 | Kuehnemann et al. | |
| 2011/0216185 A1 | 9/2011 | Laws et al. | |
| 2011/0218670 A1 | 9/2011 | Bell et al. | |
| 2013/0096713 A1 | 4/2013 | Takizawa | |
| 2013/0211593 A1 | 8/2013 | Domae et al. | |
| 2014/0052555 A1 | 2/2014 | MacIntosh | |
| 2015/0066199 A1 | 3/2015 | Shimono | |
| 2015/0203304 A1 | 7/2015 | Morency et al. | |
| 2015/0262012 A1 | 9/2015 | Kim et al. | |
| 2016/0016311 A1 | 1/2016 | Konolige et al. | |
| 2017/0057146 A1 | 3/2017 | Altonen et al. | |
| 2017/0057148 A1 | 3/2017 | Altonen et al. | |
| 2017/0076469 A1 | 3/2017 | Sonoura et al. | |
| 2017/0137236 A1 | 5/2017 | Sonoura et al. | |
| 2017/0177746 A1 | 6/2017 | Gotou | |
| 2017/0246744 A1 | 8/2017 | Chitta et al. | |
| 2018/0126553 A1 | 5/2018 | Corkum et al. | |
| 2018/0198983 A1 | 7/2018 | Fukuya et al. | |
| 2018/0243904 A1 | 8/2018 | Bradski | |
| 2018/0253516 A1 | 9/2018 | Shimano et al. | |
| 2018/0304468 A1 | 10/2018 | Holz | |
| 2019/0206059 A1 | 7/2019 | Landman | |
| 2020/0130962 A1 | 4/2020 | Yu et al. | |
| 2020/0130963 A1 | 4/2020 | Diankov et al. | |
| 2020/0134828 A1 | 4/2020 | Diankov et al. | |
| 2020/0134830 A1 | 4/2020 | Yu et al. | |
| 2020/0139553 A1 | 5/2020 | Diankov et al. | |
| 2020/0279084 A1 | 9/2020 | Davis et al. | |
| 2020/0294244 A1 | 9/2020 | Diankov et al. | |
| 2020/0302207 A1 | 9/2020 | Perkins et al. | |
| 2021/0129334 A1 | 5/2021 | Kanunikov et al. | |
| 2021/0158609 A1 | 5/2021 | Raskob et al. | |
| 2021/0260771 A1 | 8/2021 | Diankov et al. | |
| 2021/0304416 A1 | 9/2021 | Yu et al. | |
| 2022/0051411 A1 | 2/2022 | Diankov et al. | |
| 2022/0292278 A1 * | 9/2022 | Roberts | G06V 10/44 |
| 2023/0008540 A1 | 1/2023 | Diankov et al. | |
| 2023/0041343 A1 | 2/2023 | Yu et al. | |

FOREIGN PATENT DOCUMENTS

| | | |
|---|---|---|
| CN | 1791475 A | 6/2006 |
| CN | 102616578 A | 8/2012 |
| CN | 103568024 A | 2/2014 |
| CN | 103822594 A | 5/2014 |
| CN | 104608150 A | 5/2015 |
| CN | 103043359 A | 7/2015 |
| CN | 105817430 A | 8/2016 |
| CN | 106063998 A | 11/2016 |
| CN | 106660207 A | 5/2017 |
| CN | 106886165 | 6/2017 |
| CN | 106945035 A | 7/2017 |
| CN | 107889452 A | 4/2018 |
| CN | 108349083 A | 7/2018 |
| CN | 111566028 A | 8/2020 |
| CN | 111629868 A | 9/2020 |
| DE | 102014016069 A1 | 5/2015 |
| DE | 102015106936 A2 | 11/2015 |

(56) References Cited

FOREIGN PATENT DOCUMENTS

| | | |
|---|---|---|
| JP | 03234491 A | 10/1991 |
| JP | H03234491 A | 10/1991 |
| JP | H06171760 A | 6/1994 |
| JP | 07053054 A | 2/1995 |
| JP | 2007097057 A | 4/1995 |
| JP | H0797057 A | 4/1995 |
| JP | H07291450 A | 11/1995 |
| JP | 10031742 A | 2/1998 |
| JP | 2894449 B2 | 5/1999 |
| JP | H11333770 A | 12/1999 |
| JP | 2001058723 A | 3/2001 |
| JP | 2001072247 A | 3/2001 |
| JP | 2002013913 A | 1/2002 |
| JP | 3277739 A | 4/2002 |
| JP | 2003237943 A | 8/2003 |
| JP | 2004050390 A | 2/2004 |
| JP | 3596434 B2 | 12/2004 |
| JP | 3849514 B2 | 11/2006 |
| JP | 2006300929 A | 11/2006 |
| JP | 2007254128 A | 10/2007 |
| JP | 2010247959 A | 11/2010 |
| JP | 2013129034 A | 7/2013 |
| JP | 2013145525 A | 7/2013 |
| JP | 5429614 B2 | 2/2014 |
| JP | 2017058130 A | 3/2017 |
| JP | 2013129034 A | 7/2017 |
| JP | 2017520418 A | 7/2017 |
| JP | 2017149569 A | 8/2017 |
| JP | 2018047544 A | 3/2018 |
| JP | 6374993 B2 | 8/2018 |
| JP | 6461712 B2 | 1/2019 |
| JP | 2019005871 A | 1/2019 |
| JP | 6486114 B2 | 3/2019 |
| JP | 2019509559 A | 4/2019 |
| JP | 2019136828 A | 8/2019 |
| JP | 2021507857 A | 2/2021 |
| WO | 2017146895 A1 | 8/2017 |
| WO | 2018185861 A1 | 10/2018 |

OTHER PUBLICATIONS

Notice of Allowance dated Jun. 7, 2019 for U.S. Appl. No. 16/290,741, filed Mar. 1, 2019, 8 pages.

Non-Final Office Action dated Jul. 12, 2019 for U.S. Appl. No. 16/443,743, filed Jun. 17, 2019, 11 pages.

Notice of Allowance dated Oct. 9, 2019 for U.S. Appl. No. 16/443,743, filed Jun. 17, 2019, 12 pages.

Non-Final Office Action dated Jul. 15, 2019 for U.S. Appl. No. 16/443,757, filed Jun. 17, 2019, 12 pages.

Notice of Allowance dated Oct. 7, 2019 for U.S. Appl. No. 16/443,757, filed Jun. 17, 2019, 12 pages.

Non-Final Office Action dated Nov. 14, 2019 for U.S. Appl. No. 16/539,790, filed Aug. 13, 2019, 16 pages.

Korean Intellectual Property Office, International Application Division, International Search Report and Written Opinion for PCT/US2019/035608 filed Jun. 5, 2018, dated Aug. 29, 2019, 9 pages.

Japanese Patent Office, Notice of Reasons for Rejection for Japanese Application No. 2019-133517, dated Nov. 18, 2019, with English translation, 6 pages.

International Search Report and Written Opinion dated Feb. 19, 2020 for PCT/US2019/058672 filed Oct. 29, 2019, ISA/KR, 10 pages.

International Search Report and Written Opinion dated Feb. 17, 2020 for PCT/US2019/058650 filed Oct. 29, 2019, ISA/KR, 12 pages.

International Search Report and Written Opinion dated Feb. 19, 2020 for PCT/US2019/058656 filed Oct. 29, 2019, ISA/KR, 9 pages.

International Search Report and Written Opinion dated Feb. 20, 2020 for PCT/US2019/058666 filed Oct. 29, 2019, ISA/KR, 10 pages.

International Search Report and Written Opinion dated Feb. 24, 2020 for PCT/US2019/058677 filed Oct. 29, 2019, ISA/KR, 9 pages.

Notice of Allowance dated Mar. 9, 2020 for U.S. Appl. No. 16/539,790, filed Aug. 13, 2019, 19 pages.

Jia, Tong et al., "Depth Measurement Based on Infrared Coded Structured Light," Hindawi Publishing Corporation, Journal of Sensors, vol. 2014, Article ID 852261, 8 pages, published Oct. 19, 2014.

Japanese Patent Office, Decision to Grant Japanese Application No. 2019-133517, dated Mar. 17, 2020, 3 pages.

Japanese Patent Office, Notice of Reasons for Rejection for Japanese Application No. 2020-516651, dated Nov. 9, 2020, with English translation, 6 pages.

Japanese Patent Office, Notice of Reasons for Rejection for Japanese Application No. 2020-515142, dated Nov. 9, 2020, with English translation, 13 pages.

Japanese Patent Office, Notice of Reasons for Rejection for Japanese Application No. 2020-514759, dated Oct. 28, 2020, with English translation, 6 pages.

Japanese Patent Office, Decision to Grant Japanese Application No. 2020-514759, dated Nov. 27, 2020, 3 pages.

Japanese Patent Office, Notice of Reasons for Rejection for Japanese Application No. 2020-514750, dated Oct. 28, 2020, with English translation, 7 pages.

Japanese Patent Office, Decision to Grant Japanese Application No. 2020-514750, dated Nov. 27, 2020, 3 pages.

Japanese Patent Office, Notice of Reasons for Rejection for Japanese Application No. 2020-501166, dated Oct. 28, 2020, 2 pages.

Japanese Patent Office, Decision to Grant Japanese Application No. 2020-501166, dated Nov. 12, 2020, 3 pages.

CIPO Office Action dated Jul. 2, 2020 for Application No. 201910597137.2, 5 pages.

CIPO Office Action dated Jan. 7, 2021 for Application No. 201910597137.2, 3 pages.

Japanese Patent Office, Decision to Grant Japanese Application No. 2020-516651, dated Dec. 2, 2020, 3 pages.

Japanese Patent Office, Decision to Grant Japanese Application No. 2020-515142, dated Dec. 7, 2020, 3 pages.

CIPO Office Action dated Feb. 23, 2021 for Application No. 202010416747.0, 6 pages.

Notice of Allowance dated Feb. 10, 2021 for U.S. Appl. No. 16/736,667, filed Jan. 7, 2020, First Inventor: Rosen Diankov, 23 pages.

CIPO Office Action dated Mar. 3, 2021 for Application No. 202010482376.6, 11 pages.

German Patent Office Office Action dated Nov. 18, 2020 for Application No. 112019000125.6, 7 pages.

CIPO Notice to Grant dated Apr. 7, 2021 for Application No. 201910597137.2, 4 pages.

CIPO Office Action dated Apr. 2, 2021 for Application No. 202010482364.3, 9 pages.

CIPO Office Action dated Apr. 28, 2021 for Application No. 202010539908.5, 12 pages.

CIPO Office Action dated Mar. 19, 2021 for Application No. 202010539927.8, 7 pages.

CIPO Notice to Grant dated Apr. 13, 2021 for Application No. 202010416747.0, 4 pages.

German Patent Office Decision to Grant dated Mar. 16, 2021 for Application No. 112019000125.6, 6 pages.

Notice of Allowance dated Mar. 26, 2021 for U.S. Appl. No. 16/667,822, filed Oct. 29, 2019, 27 pages.

Holz et al., Fast Edge-Based Detection and Localization of Transport Boxes and Pallets in RGB-D Images for Mobile Robot Bin Picking, ISR 2016, Jun. 21-22, 2016, Munich, Germany, pp. 133-140, Year: 2016.

Holz et al., "Real-Time Object Detection, Localization and Verification of Fast Robotic Depalletizing," 978-1-4799-9994-1, IEEE 2015, pp. 1459-1466, Year: 2015.

Doliotis et al., "A 3D Perception-based Robotic Manipulation System for Automated Truck Unloading," 978-1-5090-2409-4, IEEE 2016, pp. 262-267, Year: 2016.

(56) References Cited

OTHER PUBLICATIONS

Non-Final Office Action dated Apr. 13, 2021 for U.S. Appl. No. 16/667,882, filed Oct. 29, 2019, 23 pages.
CIPO Notice to Grant dated May 20, 2021 for Application No. 202010539927.8, 4 pages.
International Bureau of WIPO, PCT International Preliminary Report on Patentability for PCT/US2019/035608 filed Jun. 5, 2019, dated May 14, 2021, 6 pages.
International Bureau of WIPO, PCT International Preliminary Report on Patentability for PCT/US2019/058672 filed Oct. 29, 2019, dated May 14, 2021, 7 pages.
International Bureau of WIPO, PCT International Preliminary Report on Patentability for PCT/US2019/058650 filed Oct. 29, 2019, dated May 14, 2021, 9 pages.
International Bureau of WIPO, PCT International Preliminary Report on Patentability for PCT/US2019/058656 filed Oct. 29, 2019, dated May 14, 2021, 6 pages.
International Bureau of WIPO, PCT International Preliminary Report on Patentability for PCT/US2019/058666 filed Oct. 29, 2019, dated May 14, 2021, 7 pages.
International Bureau of WIPO, PCT International Preliminary Report on Patentability for PCT/US2019/058677 filed Oct. 29, 2019, dated May 14, 2021, 6 pages.
CIPO Notice to Grant dated May 21, 2021 for Application No. 202010482376.6, 4 pages.
CIPO Notice to Grant dated Jul. 2, 2021 for Application No. 202010539908.5, 4 pages.
Notice of Allowance dated Jun. 2, 2021 for U.S. Appl. No. 16/667,822, filed Oct. 29, 2019, 20 pages.
Non-Final Office Action dated Jul. 21, 2021 for U.S. Appl. No. 16/888,376, filed May 29, 2020, 40 pages.
Notice of Allowance dated Jul. 29, 2021 for U.S. Appl. No. 16/667,840, filed Oct. 29, 2019, 35 pages.
Notice of Allowance dated Jul. 2, 2021 for U.S. Appl. No. 16/667,882, filed Oct. 29, 2019, 18 pages.
CIPO Notice to Grant dated Jun. 15, 2021 for Application No. 202010482364.3, 4 pages.
Notice of Allowance dated Nov. 5, 2021 for U.S. Appl. No. 16/888,376, filed May 29, 2020, 13 pages.
German Patent Office Office Action dated Mar. 16, 2022 for Application No. 112019000217.1, 8 pages.
Notice of Allowance dated Jun. 7, 2022 for U.S. Appl. No. 16/667,857, filed Oct. 29, 2019, 39 pages.
Non-Final Office Action dated Dec. 12, 2022 for U.S. Appl. No. 17/313,921, filed May 6, 2021, First Named Inventor: Rosen Diankov, 20 pages.
Notice of Allowance dated Dec. 16, 2022 for U.S. Appl. No. 17/344,720, filed Oct. 29, 2019, 16 pages.
Non-Final Office Action dated Dec. 7, 2022 for U.S. Appl. No. 17/512,559, filed Oct. 27, 2021, First Named Inventor: Rosen Nikolaev Diankov, 15 pages.
Japanese Patent Office, Notice of Reasons for Rejection dated Jul. 22, 2022 for Application No. 2022-097954, Applicant: MUJIN, Inc., 14 pages.
Japanese Patent Office, Notice of Reasons for Rejection dated Aug. 25, 2022 for Application No. 2022-097954, Applicant: MUJIN, Inc., 8 pages.
Japanese Patent Office, Decision to Grant Japanese Application No. 2022-097954, dated Oct. 4, 2022, 3 pages.
Non-Final Office Action dated Mar. 30, 2023 for U.S. Appl. No. 17/944,117, filed Sep. 13, 2022, First Named Inventor: Rosen Nikolaev Diankov, 12 pages.
Notice of Allowance dated Mar. 16, 2023 for U.S. Appl. No. 17/512,559, filed Oct. 27, 2021, First Named Inventor: Rosen Nikolaev Diankov, 14 pages.
Notice of Allowance dated May May 30, 2023 for U.S. Appl. No. 17/313,921, filed May 6, 2021, First Named Inventor: Rosen Diankov, 26 pages.
Notice of Allowance dated Jun. 9, 2023 for U.S. Appl. No. 17/512,559, filed Oct. 27, 2021, First Named Inventor: Rosen Nikolaev Diankov, 12 pages.
Final Office Action dated Jul. 20, 2023 for U.S. Appl. No. 17/944,117, filed Sep. 13, 2022, First Named Inventor: Rosen Nikolaev Diankov, 19 pages.
Japanese Patent Office, Notice of Reasons for Rejection for Japanese Application No. 2020-072681, dated Jun. 26, 2023, with English translation, 6 pages.
Japanese Patent Office, Notice of Reasons for Rejection for Japanese Application No. 2020-212616, dated Jul. 25, 2023, with English translation, 6 pages.
KIPO Notice of Reasons for Rejection dated Jun. 30, 2023 for Application No. 10-2021-7016611, 3 pages.
KIPO Notice of Reasons for Rejection dated Jun. 30, 2023 for Application No. 10-2021-7016615, 4 pages.
German Patent Office Decision to Grant dated Jun. 1, 2023 for Application No. 112019000217.1, 5 pages.
Japanese Patent Office, Decision to Grant Japanese Application No. 2020-216438, mailed Jul. 21, 2023, 3 pages.
Japanese Patent Office, Office Action for Japanese Application No. 2020-213054, mailed Aug. 25, 2023, 3 pages.

* cited by examiner

ROBOTIC SYSTEM WITH AUTOMATED PACKAGE REGISTRATION MECHANISM AND AUTO-DETECTION PIPELINE

CROSS-REFERENCE TO RELATED APPLICATION(S)

This application is a continuation of U.S. patent application Ser. No. 16/667,840, filed Oct. 29, 2019, now allowed, which claims the benefit of U.S. Provisional Patent Application Ser. No. 62/752,756, filed Oct. 30, 2018, and U.S. Provisional Patent Application Ser. No. 62/852,963, filed May 24, 2019, all of which are incorporated by reference herein in their entirety. This application is also related to U.S. patent application Ser. No. 16/290,741, filed Mar. 1, 2019, now issued as U.S. Pat. No. 10,369,701, and is incorporated by reference in its entirety.

This application contains subject matter related to U.S. patent application Ser. No. 16/667,822, filed Oct. 29, 2019, now issued as U.S. Pat. No. 11,062,457. The subject matter thereof is incorporated herein by reference thereto.

TECHNICAL FIELD

The present technology is directed generally to robotic systems and, more specifically, to systems, processes, and techniques for registering objects.

BACKGROUND

In many cases, packages arranged in pallets (or "palletized") for shipment to a destination, where the packages are subsequently de-palletized at the destination. Packages may be de-palletized by human workers, which can be resource-intensive and increase the risk of injury to the human workers. In industrial settings, de-palletizing operations may be performed by industrial robots, such as a robotic arm that grip, lift, transport, and deliver the package to a release point. Also, an imaging device may be utilized to capture an image of a stack of packages loaded on the pallet. A system may process the image to ensure the package is efficiently handled by the robotic arm, such as by comparing the captured image with a registered image stored in a registration data source.

On occasion, the captured image of a package may match a registered image. As a result, physical characteristics (e.g., measurements of a package's dimensions, weight, and/or center of mass) of the imaged objects may be unknown. Failure to correctly identify the physical characteristics can lead to a variety of unwanted outcomes. For example, such failure could cause a stoppage, which may require manual registration of the package. Also, such failure could result in a package being mishandled, especially if the package is relatively heavy and/or lop-sided.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
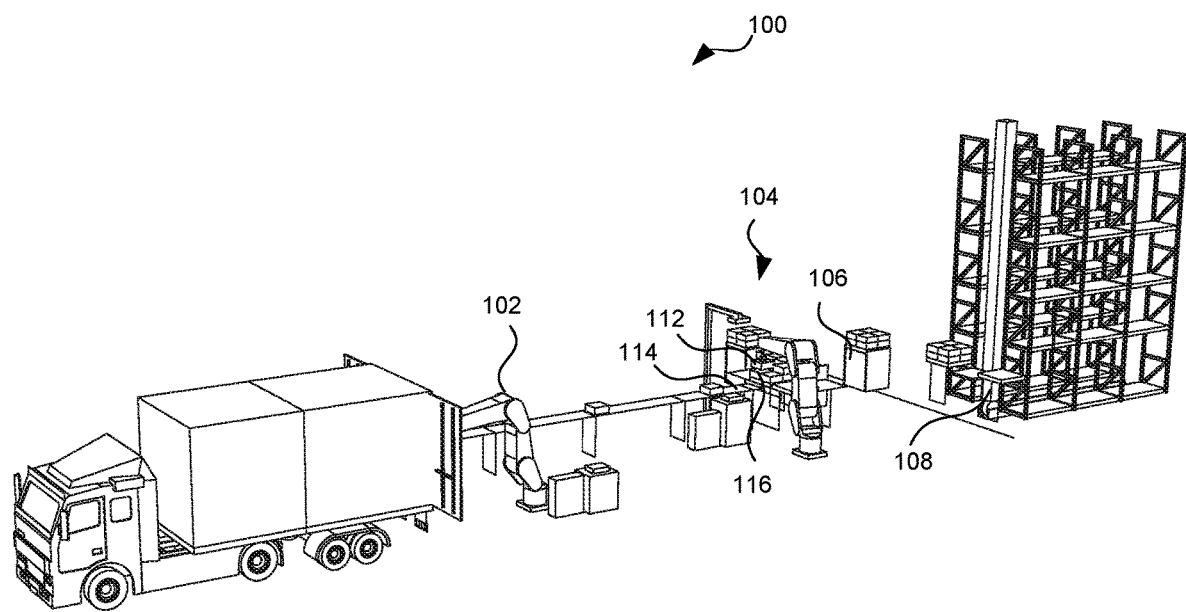
FIG. 1 illustrates an example environment in which a robotic system may operate.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Systems and methods for robotic systems with automated package registration mechanisms are described herein. A robotic system (e.g., an integrated system of devices that executes one or more designated tasks) configured in accordance with some embodiments provides enhanced usability and flexibility by manipulating and/or autonomously/automatically (e.g., with little or no human-operator inputs) registering previously unknown or unrecognized objects (e.g., packages, boxes, cases, etc.).

To determine whether objects are recognized, the robotic system can obtain and compare data regarding objects at a start location (e.g., one or more images of exposed surfaces of the objects) to registration data for known or expected objects. The robotic system can determine an object as being recognized when the compared data (e.g., a portion of the compared image) matches registration data (e.g., one of the registered surface images) for one of the objects. The robotic system can determine an object as being unrecognized when the compared data fails to match the registration data of known or expected objects.

The robotic system can manipulate the unrecognized objects according to one or more estimations and determine additional information (e.g., a surface image and/or physical dimensions) about the unrecognized objects. For example, the robotic system can identify exposed edges and/or exposed outer corners of the unrecognized objects that are separate or non-adjacent to other objects.

The estimation can include generating Minimum Viable Regions (MVRs) that represent minimum and/or optimal areas required to contact and lift the corresponding unrecognized objects. Each of the MVRs can further represent an estimate of a surface (e.g., peripheral boundaries thereof) of a single unrecognized object. In generating the MVR, exposed outer corner and exposed edges may be identified by inspecting two-dimensional (2D) and/or three-dimensional (3D) imaging data. Based on the identified exposed outer corner and exposed edges, an initial MVR may be generated by identifying edges that oppose the exposed edges. The initial MVR may be further processed, such as by determining and testing expanded and/or reduced regions, to generate a verified MVR. The initial MVR may also be processed according to certainty of the MVR determination (e.g., a status or a level representing an accuracy for the initial MVR). For example, the robotic system can identify the initial MVR as a certain MVR (e.g., a likely accurate instance of the verified MVR) when the initial MVR includes and/or is derived using three or more exposed corners. Otherwise (e.g., when the initial MVR includes and/or is derived using two or fewer exposed corners), the robotic system can identify the initial MVR as an uncertain MVR (e.g., a less likely accurate instance of the verified MVR).

The robotic system can use the verified MVR to register the unrecognized object, such as by storing the verified MVR and/or other processing results derived using the verified MVR. For example, the robotic system can use the certain MVRs to begin registering the corresponding unrecognized objects. The robotic system can further manipulate (by, e.g., gripping and transferring to perform tasks) the certain MVR objects, thereby increasing the likelihood of exposing additional corners of objects remaining at the start location. The robotic system can repeat the detection and analysis after transferring the objects to increase to identify previously uncertain MVRs as certain MVRs based on the newly exposed corners.

Thus, the embodiments described herein provides increased likelihood of accurately generating the MVRs for the unrecognized objects. The increased accuracy can lead to reduced errors, such as dropped packages and/or collisions, that result from inaccurate data about the transferred object. Further, the increased accuracy in the MVR can lead to accurate registration data, which can provide increased efficiency resulting from positively identifying subsequent processing of the same type of object. Additionally, the embodiments described herein can be used to autonomously initiate and populate master data (e.g., a collection of the registration data) without any initial data. In other words, the robotic system can autonomously register the objects without any existing registration data and without human operator interactions/inputs.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 may operate. The robotic system 100 can include and/or communicate with one or more units (e.g., robots) configured to execute one or more tasks. Aspects of the packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (by, e.g., operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include transport motors configured to transport the corresponding units/chassis from place to place.

The robotic system 100 can include sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, two-dimensional (2D) and/or three dimensional (3D) imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). As described in further detail below, the robotic system 100 can process the digital image and/or the point cloud to identify the target object 112, the start location 114, the task location 116, a pose of the target object 112, a confidence measure regarding the start location 114 and/or the pose, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end-effectors) and/or corresponding joints of the robotic system 100. The robotic system 100 can use the position sensors to track locations and/or orientations of the structural members and/or the joints during execution of the task.

Object Transfer and Registration with a Destination-Based Sensor

Figure 2:
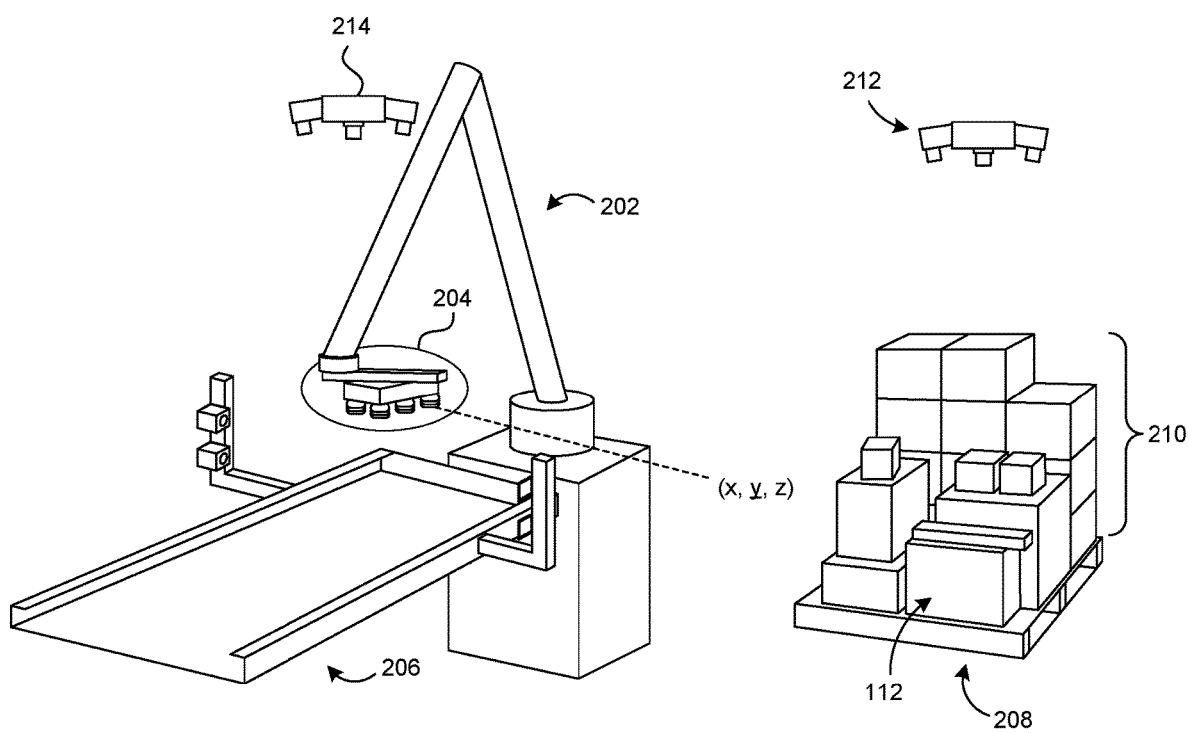
FIG. 2 illustrates the robotic system in accordance with one or more embodiments of the present technology.

FIG. 2 is an illustration of the robotic system 100 of FIG. 1 in accordance with one or more embodiments of the present technology. The robotic system 100 can include a robotic arm 202 (e.g., an instance of the transfer unit 104 of FIG. 1) that includes an end-effector 204 (e.g., a gripper). The robotic arm 202 can be configured to transfer the target object 112 between the start location 114 of FIG. 1 and the task location 116 of FIG. 1. As illustrated in FIG. 2, the start location 114 can have a pallet 208 with a target stack 210 (e.g., a grouping of objects) thereon. The task location 116 for the robotic arm 202 can be a placement location (e.g., a starting/egress point) on a conveyor 206 (e.g., an instance of the transport unit 106 of FIG. 1). For example, the robotic arm 202 can be configured to pick the objects from the target stack 210 and place them on the conveyor 206 for transport to another destination/task.

The robotic system 100 can use one or more sensors in performing the transfer operation with the robotic arm 202. In some embodiments, the robotic system 100 can include a first imaging sensor 212 and/or a second imaging sensor 214. The first imaging sensor 212 can include one or more 2D and/or 3D sensors, such as cameras and/or depth sensors, configured to image and/or analyze the start location 114. The second imaging sensor 214 can include one or more 2D and/or 3D sensors, such as cameras and/or depth sensors, configured to image and/or analyze the task location 116. For example, the first imaging sensor 212 can include one or more cameras and/or depth sensors located at a known location above and facing the start location 114. The first imaging sensor 212 can generate imaging data (e.g., 3D point clouds and/or visual or 2D images) corresponding to one or more top views of the start location 114, such as a top view of the target stack 210. As described in further detail below, the robotic system 100 can use the imaging data from the first imaging sensor 212 to derive a minimum viable region (MVR) for unrecognized (e.g., unregistered) objects in the target stack 210. The robotic system 100 can use the MVR to grip (via, e.g., the end-effector 204) and manipulate (via, e.g., the robotic arm 202) the unrecognized objects, such as in moving the unrecognized objects from the start location 114 to the task location 116. Also, the second imaging sensor 214 can include one or more cameras and/or depth sensors located at one or more known locations above/lateral to and facing the task location 116 or an associated space. Accordingly, the second imaging sensor 214 can generate imaging data corresponding to one or more top and/or side views of the target object 112 at or within a threshold distance from the task location 116.

Object Recognition

Figure 3A:
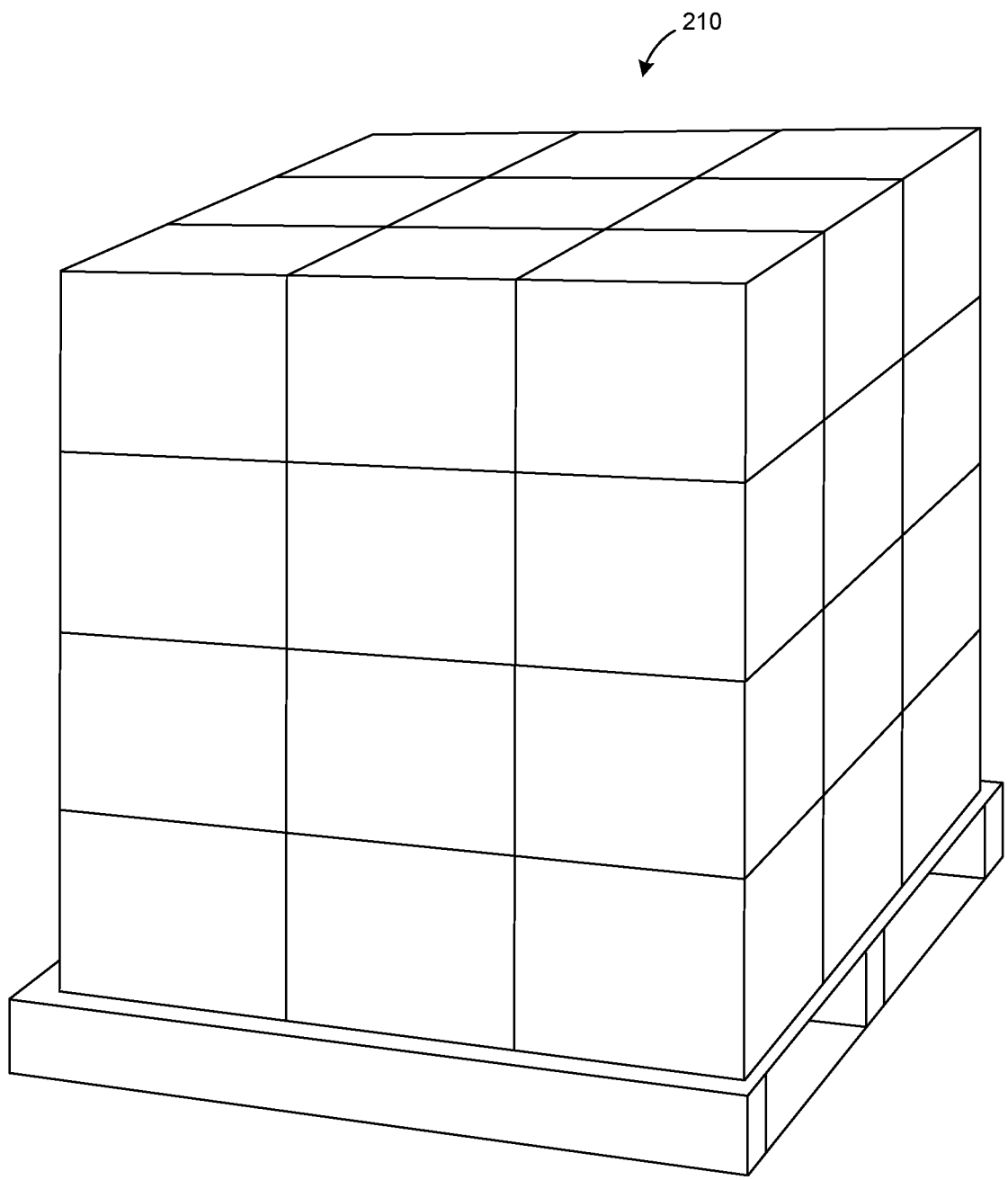
FIG. 3A illustrates an example stack of objects processed by the robotic system in accordance with one or more embodiments of the present technology.
Figure 3B:
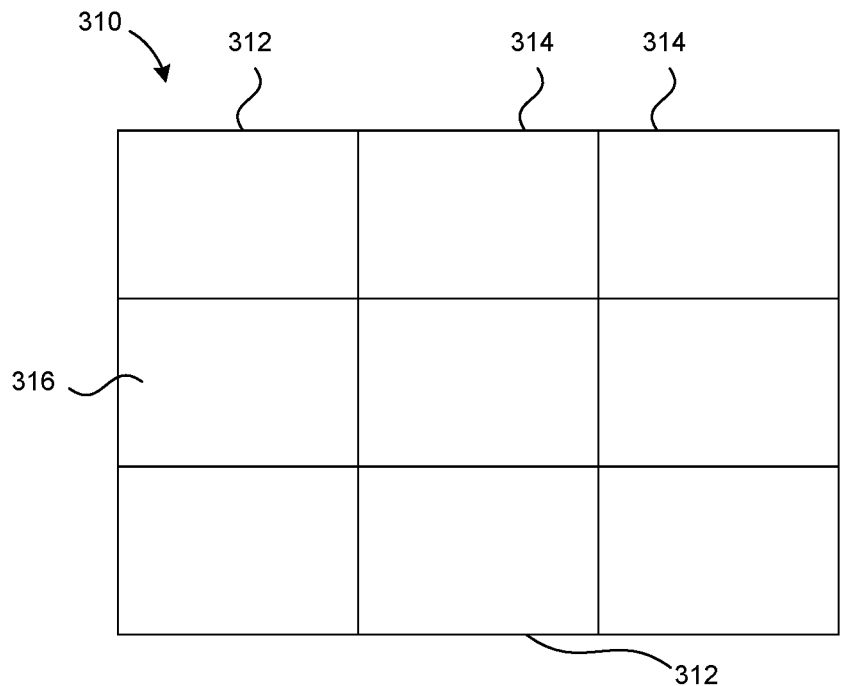
FIG. 3B illustrates a top surface of the example stack in accordance with one or more embodiments of the present technology.
Figure 3C:
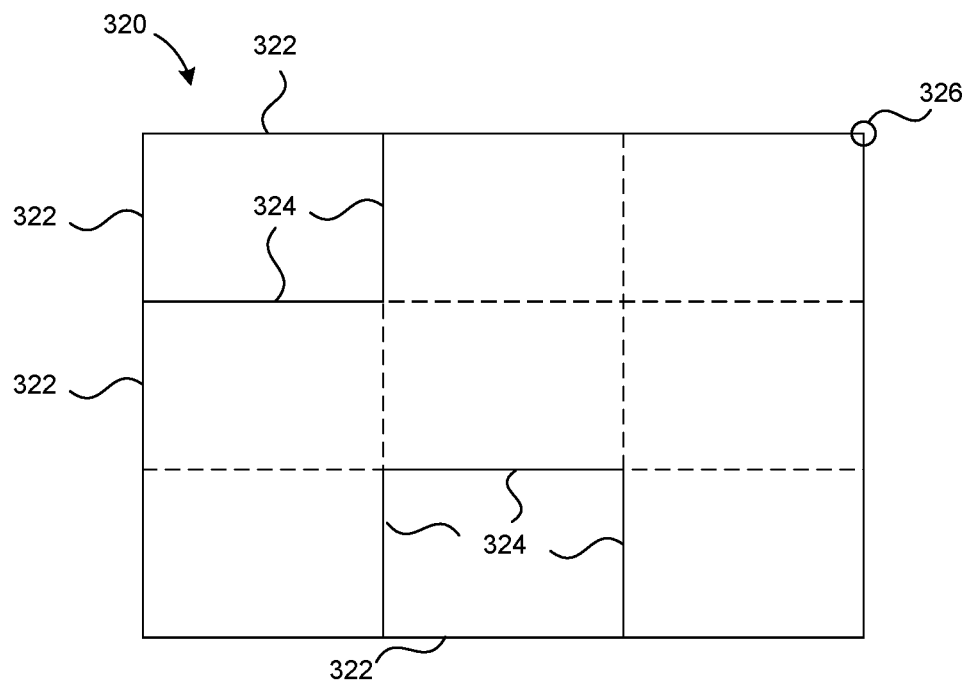
FIG. 3C illustrates sensor data corresponding to the top surface in accordance with one or more embodiments of the present technology.

FIG. 3A is an illustration of an example stack of objects (e.g., the target stack 210 of FIG. 2) processed by the robotic system 100 of FIG. 1; FIG. 3B is an illustration of a top surface of the example stack (e.g., an actual top view 310 of the target stack 210); and FIG. 3C is an illustration of sensor data (e.g., top view data 320) corresponding to the top surface, all in accordance with one or more embodiments of the present technology. Referring to FIGS. 3A, 3B, and 3C together, the robotic system 100 can be configured to transfer the objects within the target stack 210 to another location, such as the task location 116 of FIG. 1 (e.g., the conveyor 206 of FIG. 2), as described above. For transferring the objects, the robotic system 100 can use image data (e.g., the top view data 320) from the first imaging sensor 212 of FIG. 2 that is located above the target stack 210. For example, the top view data 320 can include one or more visual images and/or one or more depth maps that depict or represent the actual top view 310. Further, the robotic system 100 can analyze the top view data 320 to identify edges that may correspond to object boundaries. For example, the robotic system 100 can identify edges and/or continuous surfaces represented in the image data based on differences in depth measurements and/or image traits (e.g., different colors, linear patterns, shadows, differences in clarity, etc.). The robotic system 100 can identify exposed edges 322 (e.g., edges of object top surfaces that are not horizontally abutting another object/surface at substantially the same height), such as based on differences in the depth measurements.

The target stack 210 may include objects registered in master data that includes registration records for expected or previously process objects and/or unexpected objects not registered in the master data. As such, the robotic system 100 can use the image data of object surfaces 316 to recognize or identify the objects that are within the target stack 210. In some embodiments, the robotic system 100 can compare the image data or one or more portions therein to the master data to recognize the objects within the target stack 210. For example, the robotic system 100 can identify the known objects (e.g., recognized objects 312) within the target stack 210 when a portion of the top view data 320 matches one or more images of the object surfaces 316 in registration data. The remaining portions of the actual top view 310 (e.g., portions not matching the registration data) can correspond to unrecognized objects 314. The edges of the unrecognized objects 314 are shown using dashed lines in FIG. 3C.

Based on matching the image data, the robotic system 100 can locate the recognized objects 312 within the corresponding image data, which can be further translated (via, e.g., pre-calibrated table and/or equations that map pixel locations to a coordinate system) to real-world locations for the target stack 210. Further, the robotic system 100 can estimate locations of non-exposed edges of the recognized objects 312 based on the match. For example, the robotic system 100 can obtain dimensions of the recognized objects 312 from the master data. The robotic system 100 can measure portions of the image data that is separated by the known dimensions from the exposed edges 322 of the recognized objects 312. According to the mapping, the robotic system 100 can determine one or more registration-based edges 324 for the recognized objects 312 and/or similarly map the registration-based edges 324 to real-world locations similarly as described above.

In some embodiments, the robotic system 100 can identify exposed outer corners 326 of the target stack 210 as represented in the image data (e.g., the point cloud data). For example, the robotic system 100 can identify the exposed outer corners 326 based on detecting intersections/junctions between a set of two or more of the exposed edges 322 (e.g., edges identified in 3D image data, also referred to as 3D edges) having different orientations (e.g., extending at different angles). In one or more embodiments, the robotic system 100 can identify the exposed outer corners 326 when the exposed edges 322 form an angle that is within a predetermined range (also referred to as an angle range), such as for a threshold corner angle range greater than and/or less than 90°. As described in detail below, the robotic system 100 can use the exposed outer corners 326 and the corresponding exposed edges 322 to process and/or manipulate the unrecognized objects 314.

Processing of Unrecognized Objects

Figure 4A:
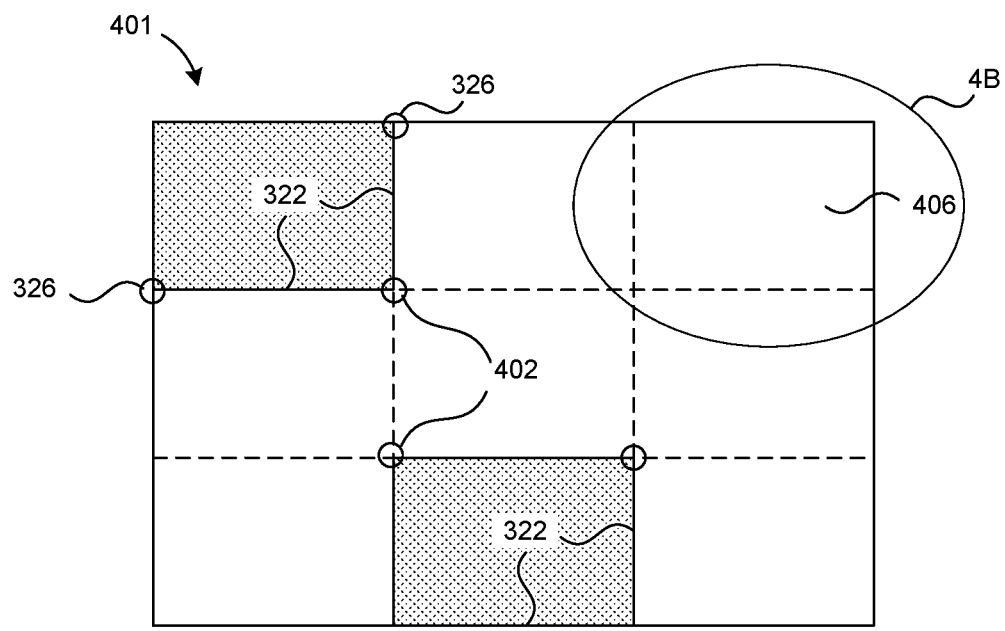
FIG. 4A illustrates sensor data corresponding to a top surface following an initial set of operations in accordance with one or more embodiments of the present technology.

In some embodiments, the robotic system 100 of FIG. 1 can process (e.g., identify and/or transfer) the objects according to recognition status and/or relative locations of the objects within the target stack 210 of FIG. 2. For example, the robotic system 100 can pick and transfer the recognized objects first, and then generate another set of image data from the sensors (e.g., the first imaging sensor 212 of FIG. 2). FIG. 4A is an illustration of sensor data 401 corresponding to a top surface following an initial set of operations (e.g., picking and transferring the recognized objects 312) in accordance with one or more embodiments of the present technology. The shaded areas in FIG. 4A correspond to changes in depth measurements following the removal of the recognized objects 312 shown in FIGS. 3B and 3C.

When the robotic system 100 does not identify any of the recognized objects 312 in the image data (e.g., the 2D image and/or the 3D point cloud), the robotic system 100 can process the image data to identify any exposed corners 326 and/or the exposed edges 322 for locating the unrecognized objects 314 of FIG. 3A. For example, the robotic system 100 can process the sensor data 401 (e.g., the 3D point cloud) similarly as described above to identify the exposed outer corners 326 and/or the exposed edges 322. Accordingly, the robotic system 100 can additionally identify and/or locate any corners/edges that are exposed after removing the recognized objects 312. In some embodiments, the robotic system 100 can further identify exposed inner corners 402 as intersections/junctions between two or more of the exposed edges 322 according to a corresponding threshold. For example, the robotic system 100 can identify the exposed inner corners 402 as junctions between two or more of the exposed edges 322 that exceed 180° relative to the corresponding continuous surfaces. In some embodiments, the robotic system 100 can identify the exposed inner corners 402 when the exposed edges 322 form an angle that is within a threshold angle range greater than and/or less than 270°.

In some embodiments, when none of the recognized objects 312 are remaining, the robotic system 100 can identify registration targets 406 in the target stack 210 (e.g., from amongst the unrecognized objects 314) based on the exposed corners and/or the exposed edges. For example, the robotic system 100 can evaluate the exposed corners/edges according to a set of preferences and/or scoring mechanism. In some embodiments, the robotic system 100 can be configured to select the exposed outer corners 326 nearest to the robotic arm 202 of FIG. 2. The robotic system 100 can select the corresponding region of the sensor data 401 and the corresponding unrecognized object 314 associated with the selected exposed outer corners 326. In other words, after processing the recognized objects 312, the robotic system 100 can process the unrecognized objects 314 that form/constitute the exposed outer corners 326 of the target stack 210. Based on analyzing the corresponding portions of the sensor data 401 (via, e.g., deriving the MVR), the robotic system 100 can grip the unrecognized objects 314, lift and/or horizontally transfer the gripped object, and/or image the gripped object for registration purposes. Additionally, after imaging the gripped object, the robotic system 100 can transfer the gripped object to a destination (e.g., the conveyor 206 of FIG. 2).

Figure 4B:
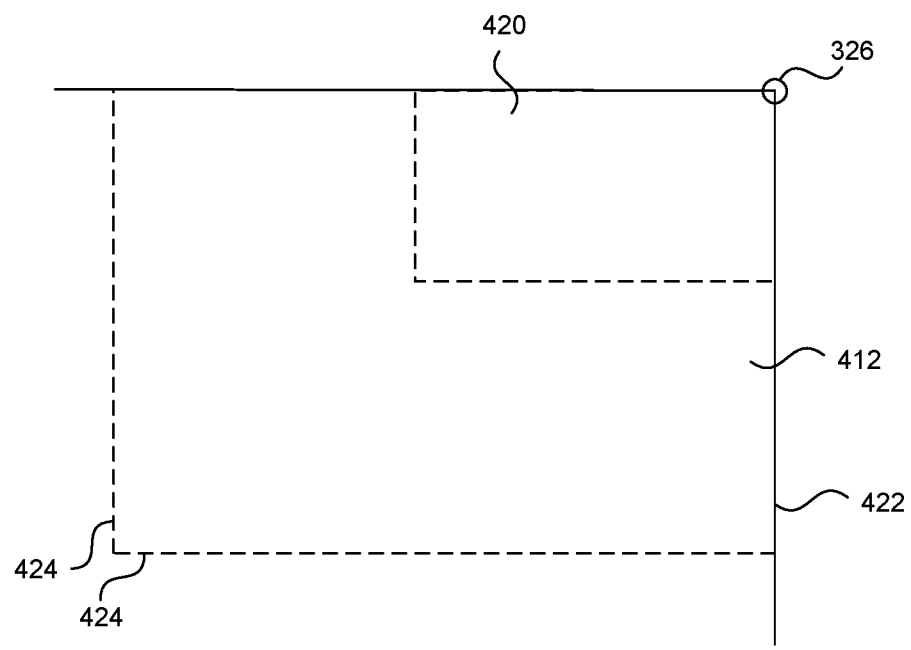
FIG. 4B illustrates a portion of the sensor data illustrated in FIG. 4A in accordance with one or more embodiments of the present technology.

For further describing the sensor data analysis, FIG. 4B is a detailed illustration of a portion 4B of the sensor data 401 of FIG. 4A in accordance with one or more embodiments of the present technology. The robotic system 100 can analyze the sensor data 401 to derive an MVR 412. The MVR 412 can represent a minimum-sized area used to contact, grip, and/or lift objects. Also, the MVR 412 can represent an estimate of a surface and/or peripheral boundaries of a single unrecognized object. For example, the MVR 412 can be associated with a footprint of the end-effector 204 or a larger area with additional/buffer regions surrounding the footprint. Also, for example, the MVR 412 can be associated with estimated locations of horizontal boundaries/edges of an unrecognized object (e.g., the selected registration target). In some embodiments, the MVR 412 can correspond to a minimum and/or a maximum candidate size, which can correspond to physical dimensions (e.g., lengths, widths, heights, diameters, circumferences, etc.) for the smallest/largest possible instance of the objects expected in the target stack 210, respectively. In other words, the robotic system 100 can determine that none of the objects within the target stack 210 will have dimensions that are less than the minimum candidate size or greater than the maximum candidate size. The minimum and maximum candidate sizes can be predetermined values (i.e. values provided or known in advance of processing the target stack 210). Details regarding the derivation of the MVR 412 are described below.

The robotic system 100 can use the MVR 412 to determine a grip location 420. The grip location 420 can correspond to an area on the object/stack that will be directly under and/or contact the end-effector 204 for the initial manipulation. In other words, the robotic system 100 can place the gripper over the grip location 420 to grip the corresponding object for subsequent manipulations (e.g., lift, horizontal transfer, and/or data collection processes for registration). In some embodiments the robotic system 100 can select the grip location 420 from the set of potential grip locations. For example, the robotic system 100 can select from the set according to a relative orientation of the arm (e.g., with preference for the robotic arm extending across the exposed edges 322 and not overlapping other portions).

In some embodiments, the robotic system 100 can derive the MVR 412 based on estimated edges 424. For example, the robotic system 100 can select or identify an instance of the exposed outer corner 326 (e.g., a 3D corner) of a top layer of objects in the target stack 210. The robotic system 100 can move away from the selected exposed outer corner 326 along the associated exposed edges 322 (e.g., 3D meeting of planes of objects in the top layer of the target stack 210 at/forming the selected corner). While moving along the exposed edges 322, the robotic system 100 can identify the estimated edges 424 (e.g., edges of top planes of objects in the target stack 210 that are located internal to a footprint of the top layer of the target stack 210) based on differences in 3D depth measurements and/or 2D image traits (e.g., brightness, color, etc.) in the sensor data 401. The robotic system 100 can identify edges or lines in 2D/3D image data that intersect with and/or are within a threshold separation distance from the traversed edge. The robotic system 100 can test the identified edges in determining the estimated edges 424. The robotic system 100 may test/verify the estimated edges 424 based on comparing orientation of the identified edges to the orientation of the exposed edges 322. For example, the robotic system 100 can verify an identified edge as the estimated edge 424 when it is parallel with one of the exposed edges 322. In some embodiments, the robotic system 100 can test for the parallel orientations based on verifying equal distances between two or more corresponding points on the tested pair of edges (e.g., the identified edge and the one of the exposed edges 322). In some embodiments, the robotic system 100 can identify the parallel orientations when the tested pair of edges and/or extensions thereof intersect a common edge (e.g., an edge that intersects each of the pair of edges) at same angles, such as when both edges and/or extensions thereof intersect the tested pair of edges at angle between 80°-100°.

Accordingly, the robotic system 100 can derive a grip location 420 that does not overlap detected lines (e.g., 2D edges and/or incomplete edges) and/or the estimated edges

424. The robotic system 100 can derive the grip location 420 based on balancing a ratio between distances between edges of the MVR 412 and the nearest detected lines and/or the estimated edges 424 to the edges of the MVR 412. Since the robotic system 100 will be gripping the object at or about a corner based on the MVR 412, the robotic system 100 can derive the grip location 420 that will reduce maximum potential torque along any one particular direction based on balancing the ratio. Also, the robotic system 100 may further derive or adjust the MVR 412 to coincide with or extend out to the estimated edges 424.

The robotic system 100 can use the derived grip location 420 to maneuver the robotic arm 202 of FIG. 2 and the end-effector 204. The robotic system 100 can grip the object (e.g., the registration target 406) located at the corner of the stack at the grip location 420. In some embodiments, the robotic system 100 can lift and/or horizontally transfer the gripped object to clearly distinguish the previously non-exposed edges (e.g., by slightly moving the gripped object away from the object(s) with previously non-exposed edges). For example, the robotic system 100 can lift and/or horizontally transfer the object by a predetermined height that corresponds to a minimum distance for accurately distinguishing edges. Also, for example, the robotic system 100 can lift and/or horizontally transfer the object while monitoring and/or analyzing the height changes of the object and/or a tilt in the end-effector, such that additional edges opposite to the exposed edges 322 become recognizable. The robotic system 100 can obtain and process data during and/or after the initial lift to further describe the unrecognized objects 314.

MVR Detection Overview

The present embodiments may relate to generating accurate Minimum Viable Regions (MVRs) of an object. An exposed outer corner and exposed edges may be identified by inspecting 2D and/or 3D imaging data (e.g., point cloud data). Based on the identified exposed outer corner and exposed edges, an initial MVR may be generated by identifying edges that oppose the exposed edges. In some embodiments, the robotic system 100 can generate the MVR based on identifying opposing edges (e.g., the estimated edges 424 of FIG. 4B) that correspond to (e.g., are parallel to) exposed edges in the top layer of the target stack 210. The initial MVR may extend from the exposed outer corner along the exposed edges to the opposing edges.

After the initial MVR is determined, potential MVR regions expanding from the initial MVR to an end of a surface or layer (e.g., a set of laterally adjacent locations having depth measures within a threshold range of each other) defined by the point cloud may be identified. A merged MVR of the object may include the initial MVR and the potential MVRs. A verified MVR may be generated by inspecting/testing the merged MVR. The verified MVR may represent an accurate region that encompasses the unrecognized object. Based on the verified MVR, the robotic system 100 as described herein may register the object and perform a task with respect to the object, such as grip and/or move the object.

In many cases, an edge (e.g., an outer or exposed edge) of the object may be identified. For example, outer edges of objects located along the periphery of the target stack 210 of FIG. 2 (e.g., the exposed edges 322 of FIG. 3C) can be absent of and/or separated from any surrounding objects. Accordingly, the imaging result (e.g., the 3D point cloud) can include abrupt changes in depicted values (e.g., height measurements and/or image values, such as colors or brightness) representative of the outer edges. However, in many cases, other edges may not be visible or may be difficult to accurately define (e.g., based on a threshold confidence value). For example, surface designs/images on a box may lead to incorrect edges identified on the object. Accordingly, it may be difficult to accurately separate portions in the 2D/3D imaging data due to incomplete edges.

The robotic system 100 may identify the exposed outer corners 326 and/or exposed edges 322 of an object by inspecting the image data (e.g., a point cloud and/or a 2D image) and determining one or more layers. For example, the robotic system 100 can identify a top layer of object(s) (e.g., the unrecognized objects 314 of FIG. 3B) in the target stack 210 based on the imaging result. Within the top layer, the robotic system 100 can select an object and/or a portion of a surface (e.g., a region having height values within a threshold continuity range of each other) for MVR derivation. The robotic system 100 can estimate that the exposed edges forming/defining the surface (e.g., one of the layers or a portion therein) correspond to lateral/peripheral boundaries of the surface and/or the corresponding object. An initial MVR may be generated by identifying opposing edges that oppose the exposed edges, wherein the initial MVR may extend from the exposed outer corner (e.g., an intersection formed by a set of the exposed edges and/or the peripheral boundaries) along to the exposed edges to opposing edges.

The robotic system 100 can further process (e.g., adjust) the initial MVR by expanding and/or shrinking the initial estimate based on markers (e.g., incomplete edges) in the imaging data. The adjusted MVR can be inspected to determine a final MVR used to determine the grip location 420 and/or register the unrecognized object.

Figure 5:
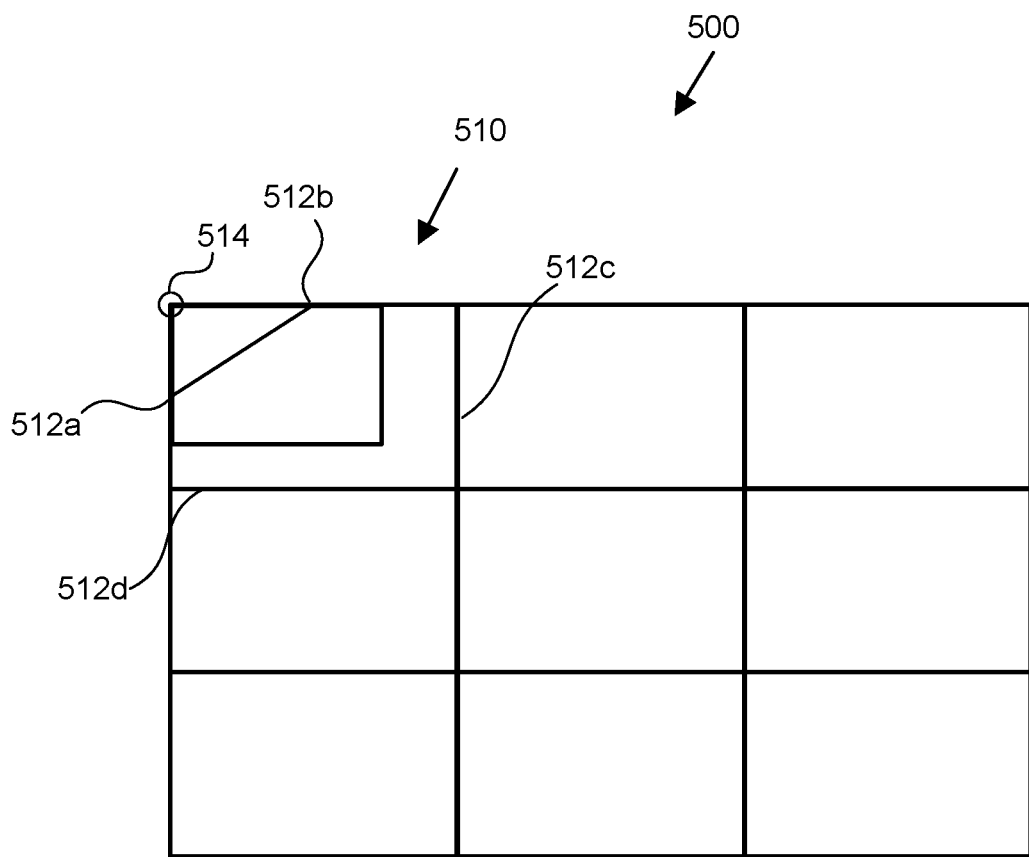
FIG. 5 illustrates a top view of a set of palletized packages in accordance with some embodiments of the present technology.

FIG. 5 illustrates a top view of a set of palletized packages 500 (e.g., the target stack 210 of FIG. 2) in accordance with some embodiments of the present technology. As shown in FIG. 5, a first object 510 can include edges 512*a-d*. An edge can represent a boundary of the object as viewed from a given view (e.g., a top view). Under certain situations, at least a portion of the edges 512*a-d* (e.g., edges 512*c-d*) may be closed and abut other adjacent objects/edges. Conversely, some of the edges (e.g., the edges 512*a-b*) may be open and correspond to the exposed edges 322 of FIG. 3C.

The first box 510 can include one or more exposed outer corners 514 that are separated from or without any horizontally adjacent objects. The exposed outer corners 514 may correspond to the exposed outer corners 326 of FIG. 3 of the stack. As discussed below, the image data (e.g., a point cloud and/or a 2D image) may be inspected to identify exposed edges and an exposed outer corner of a package.

Point Cloud Segmentation

Figure 6:
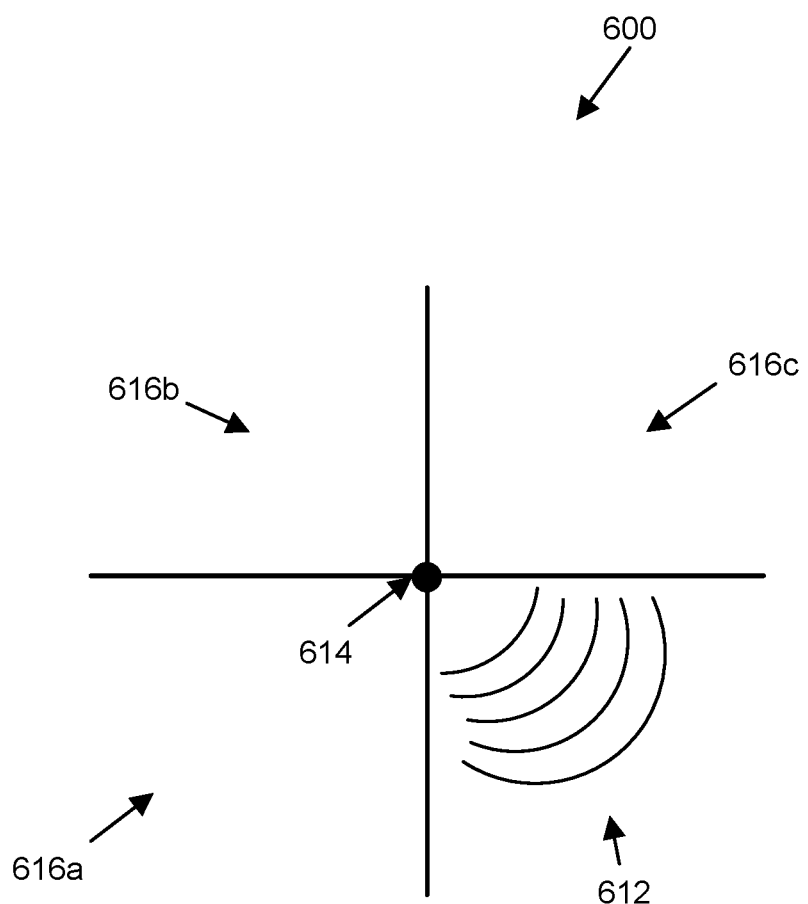
FIG. 6 illustrates a graphical representation of an exposed outer corner in accordance with some embodiments of the present technology.

FIG. 6 illustrates a graphical representation 600 of an exposed outer corner in accordance with some embodiments of the present technology. As shown in FIG. 6, a point cloud (e.g., the graphical representation 600) may be processed to identify an exposed outer corner 614 (e.g., one of the exposed outer corners 326 of FIG. 3). For example, the point cloud can correspond to a top-view generated by a 3D camera of the first object 510 of FIG. 5 or a portion thereof. The point cloud may include a 3-dimensional point cloud with multiple layers indicative of depth. Each layer and/or a surface may correspond to a set of horizontally adjacent depth values that are within a threshold continuity range from each other. For example, the threshold continuity range can require horizontally adjacent locations to have depth measures that are within a threshold distance (e.g., less than 1 centimeter) from each other or within a threshold distance according to a slope. Also, the threshold continuity range can define a floor and/or a slope relative to a reference height (e.g., a highest/closest point in the target stack 310). The threshold continuity range can similarity define limits for 2D image characteristics (e.g., color and/or brightness) for identifying continuity across a set of horizontally adjacent locations. A depth of a layer of the point cloud may correspond to a separation along a direction normal to a surface of a corresponding object (e.g., vertical separation).

Accordingly, the point cloud may be analyzed and processed to separate the layers and/or to identify open 3D edges/corners. In some embodiments, the robotic system 100 (e.g., one or more processors therein) can identify layers based on grouping depth values in the point cloud according to one or more predetermined continuity rules/threshold. For example, the robotic system 100 can group a set of horizontally adjacent/connected depth values when the depth values are within the threshold continuity range of each other and/or when the depth values follow a constant slope representative of a flat and continuous surface. The robotic system 100 can identify exposed edges (e.g., exposed edges 512a and 512b of FIG. 5) as boundaries of the identified layers. In other words, the robotic system 100 can identify the exposed edges 512a and 512b as horizontal peripheral locations of the layer/surface where a qualifying depth change occurs. In general, the depth measures for objects/edges forming a top layer of the target stack 210 may have a lower magnitude (e.g., representative of closer distance to the first image device 312) than objects/edges forming a lower layer below the top layer.

In some embodiments, the robotic system 100 can determine the exposed edges based on identifying visual lines in 2D visual images. For example, pallets and/or floors may correspond to a known color, brightness, etc. Accordingly, the robotic system 100 can identify lines that border such known patterns as exposed edges of the object(s). Also, the robotic system 100 can use the 2D analysis to verify the 3D identification of the exposed edges.

Based on the exposed edges, the robotic system 100 can identify open 3D corners (e.g., exposed outer corner 514). For example, the robotic system 100 can identify shapes/angles associated with the exposed edges. The robotic system 100 can be configured to determine the exposed outer corner 514 as location in the point cloud where the exposed edges (e.g., edges 512a-b) intersect at/form an angle within a threshold angle range (e.g., 80°-100°).

As an illustrative example, the robotic system 100 can identify the open 3D corner 614 by identifying a first region 612 and adjacent regions 616a-c. The robotic system 100 can identify the first region 612 when a set of adjacent horizontal locations in the scanned region layer having depth values that are within the threshold continuity range from each other. The robotic system 100 can identify the adjacent regions 616a-c as other horizontal locations having depth values that are outside of the threshold continuity range from depth values in the first region 612. In some embodiments, the robotic system 100 can identify edges of the first region 612 and/or start of the adjacent regions 616a-c when depth values change to fall outside of the threshold continuity range and/or when the locations of the depth value changes match a shape template (e.g., a straight line and/or a minimum separation width between objects). More specifically, the adjacent regions 616a-c can have the depth values that represent distances that are further from the first image imaging sensor 212 than the depth values for the surface of the target stack 210 (i.e. the first region 612). The resulting edges between the first region 612 and the adjacent regions 616a and 616c can correspond to the exposed edges. In some embodiments, identifying the open 3D corner 614 may include verifying that the first region 612 forms a quadrant, while the adjacent regions 616a-c correspond to remaining quadrants and/or empty spaces, such as for locations outside of the object stack. An empty space may indicate a space detected with very sparse point cloud which may be considered as point cloud noise.

Other 3D corners may be determined using the 3D point cloud. In some embodiments, the exposed outer corner may be a contour shape, and an shaped corner may not comprise a valid corner. Accordingly, the robotic system 100 may identify edge segments that meet one or requirements (e.g., a minimum straight continuous length), and based on extending such edge segments by a predetermined length. When the extended edge segments intersect other segments or extended segments at an angle, the robotic system 100 can identify a point on the contour shape (e.g., a mid-point of the arc located between the intersecting edge segments) as the exposed outer corner.

In some embodiments, the 3D corners may be ranked. For example, 3D corners surrounded by empty space (e.g., for objects located at the corner of a top layer in the stack) may be ranked higher than other objects. The open 3D corner 614 can be ranked based on other factors, such as a size of the first region 612, the location of the open 3D corner 614 relative to a shape of the first region 612, a difference in depth values between surrounding regions (e.g., between the first region 612 and the adjacent regions 616a and 616c), and/or a horizontal distance between the first region 612 and another region (e.g., another surface/object) having depth values within the threshold continuity range from those in the first region 616a.

In some embodiments, the robotic system 100 may identify an incomplete edge. The incomplete edges may be edges identified in 2D and/or 3D analysis that may or may not be actual edges. Some of the incomplete edges can correspond to actual edges of boxes/gaps between boxes that may not be identifiable because of the noise placement of other objects, and/or the capacity/position of an imaging device (e.g., camera). The incomplete edges may also be visual patterns or markings on the object surfaces detected from 2D image analysis, such as surface drawings or markings or a division/seam between box flaps that are taped together. Conversely, boxes with no patterns may not have any 2D lines that can be identified as the incomplete edges. The robotic system 100 can identify the incomplete edges at locations in the sensor outputs that exceed noise variances but fail to completely satisfy rules/thresholds for edge identification. In some embodiments, the robotic system 100 can identify the exposed outer edges (e.g., peripheral edges of the first region 612) using the 3D sensor outputs and identify the incomplete edges using the 2D sensor outputs. Also, the robotic system 100 may identify the incomplete edges as 2D or 3D edges that do not intersect with other edges at an angle that does fall within the angle threshold range. Details regarding the incomplete edges are described in detail below.

Generating an Initial MVR

Figure 7:
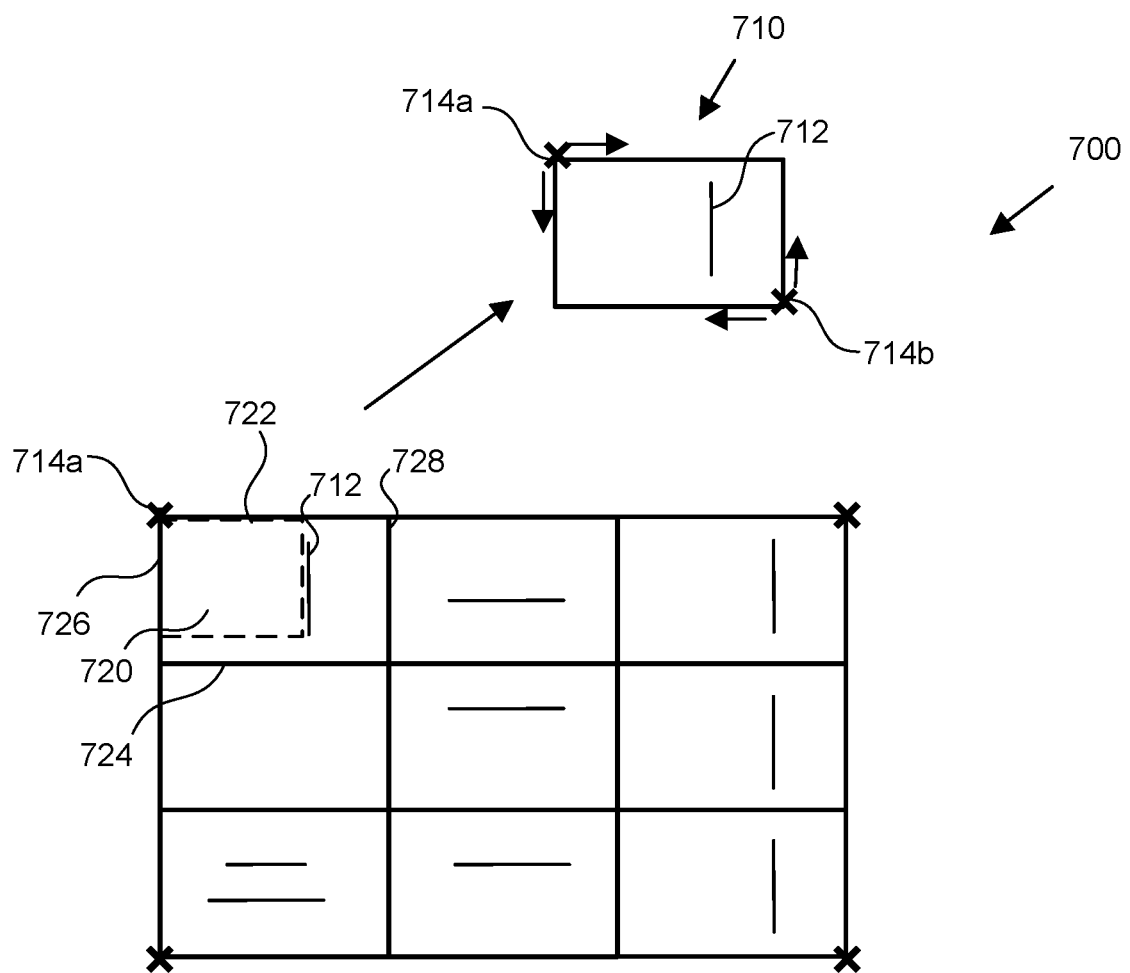
FIG. 7 is a block diagram of a set of palletized packages in accordance with some embodiments of the present technology.

FIG. 7 illustrates a top view of a set of palletized packages in accordance with some embodiments of the present technology. FIG. 7 further illustrates an initial MVR 710 in relation to the top view (e.g., 3D and/or 2D sensor image of the target stack 210 of FIG. 2). The initial MVR 710 may represent an initial estimate of the bounds of an MVR and/or edges of a corresponding object. In other words, the initial MVR 710 can represent an initial estimate of a surface for one unrecognized object. The robotic system 100 can use the open 3D corner and/or exposed edges to derive the initial MVR 710. Deriving the initial MVR 710 may include inspecting each of the layers identified from the point cloud to identify objects, edges, corners, etc. For example, the robotic system 100 can derive the initial MVR 710 as a region in the point cloud data (e.g., 3D sensor output) having depth values within the threshold continuity range from each other (e.g., the first region 612 of FIG. 6). In other words, the robotic system 100 can derive the initial MVR as the grouping of horizontally adjacent locations having sufficiently identical or linearly patterned depth values corresponding to a continuous surface. Accordingly, the robotic system 100 can derive the initial MVR as an area that is at least partially bounded by the exposed outer corners 514 (e.g., a first corner 714a and/or a second corner 714b) and corresponding exposed edges. For example, the initial MVR 710 can extend from first corner 714a along exposed edges 722 and 726 to opposing edges 724 and 728. In some embodiments, the robotic system 100 may derive the initial MVR 710 by starting at an open 3D corner (e.g., the first corner 714a) and following exposed edges (e.g., away from the open 3D corner). The initial MVR 710 may be extended until the followed exposed edges are intersected or faced by other exposed edges (e.g., edges opposite and/or parallel to the non-followed edge such as the opposing edges 724 and/or 728).

In some instances, the initial MVR 710 may correspond to surfaces of multiple objects due to various reasons (e.g., spacing between objects, sensor granularity, etc.). Accordingly, the robotic system 100 may verify one or more dimensions of the derived initial MVR 710. The robotic system 100 can verify that the one or more dimensions of the MVR 710 are larger than a minimum candidate size and smaller than a maximum candidate size. The threshold dimension may represent a smallest and/or a largest dimension for objects receivable/expected for the robotic system 100. Also, the threshold dimension may represent a horizontal footprint of the end-effector 204 of FIG. 2, such as for representing a minimum size for the gripping/contact area.

When one or more dimensions of the initial MVR 710 fall outside of the thresholds (by, e.g., exceeding the maximum dimension or falling below the minimum dimension), the robotic system 100 can adjust the initial MVR 710, such as by conducting a further segmentation of the initial MVR 710 (e.g., a top most layer) according to incomplete edges 712 (e.g., 2D/3D edges that do not match or intersect another edge at one or more ends). In other words, the robotic system 100 can adjust/reduce the initial MVR according to the incomplete edges 712 and test a corresponding result. In some embodiments, the robotic system 100 can determine the incomplete edge 712 as 2D edges and/or 3D edges that do not intersect with an exposed edge on one or more ends. Also, the robotic system 100 can determine the incomplete edge 712 as 2D and/or 3D edges that are parallel to one of the exposed edges. In some embodiments, the robotic system 100 can calculate confidence values associate with the incomplete edges 712. The confidence values can represent a likelihood that the incomplete edges 712 correspond to surface edges and/or separations between adjacent objects. As an example, the robotic system 100 can calculate the confidence values based on a total length of the incomplete edges 712, a shape of the incomplete edges 712, and/or a difference between the incomplete edges 712 and portions surrounding the incomplete edges 712 (e.g., for depth, color, brightness, etc.).

As described in detail below, the robotic system 100 may derive a verified MVR 720 based on decreasing the initial MVR 710 according to or down to the incomplete edges 712. In other words, the robotic system 100 can identify a reduced candidate MVR as an area within the initial MVR 710 that is bounded by one or more of the incomplete edges 712 instead of opposite parallel edges 724 and/or 728. The robotic system 100 can decrease the initial MVR 710 by following an opposite parallel edge (e.g., opposite parallel edges 724, 728, which may be 2D and/or 3D edges such as the estimated edges 424 of FIG. 4B) towards a corresponding exposed edge (e.g., corresponding exposed edges 722, 726, respectively) until the incomplete edge 712 is reached. In other words, the robotic system 100 can identify the second corner 714b associated with the initial MVR 710, and then move away from the second corner 714 along associated edges (e.g., the opposite parallel edges 724 and/or 728) while searching for other edges (e.g., intersecting and/or parallel edges, such as the incomplete edges 712). The robotic system 100 can test an orientation of the identified edges as described above. For example, the robotic system 100 may verify the identified edges when an angle between the traversed edge and the identified edge is within a threshold angle range (e.g., 80° to 100° and/or other ranges that correspond to a right angle). Also, the robotic system 100 may verify the identified edges are parallel to corresponding exposed edges, such as when a set of distances between multiple sets of corresponding points along the identified and the non-traversed exposed edge are within a threshold range from each other. This may be performed iteratively or incrementally. If the MVR cannot be reduced any further, the robotic system 100 may conclude the resulting area as the verified MVR region 720.

The robotic system 100 can verify the reduced candidate MVR based on comparing the decreased dimension to the thresholds as described above. For example, the robotic system 100 can derive the reduced candidate MVR as the verified MVR 720 when the decreased area defined by the incomplete edge 712 satisfies the min/max thresholds. Also, the robotic system 100 can verify the reduced candidate MVR when the incomplete edges 712 correspond to confidence values exceeding a predetermined threshold. Further, the robotic system 100 can extend the incomplete edges 712 by a threshold distance in one or more direction. For example, the robotic system 100 may verify the reduced candidate MVR when the extended incomplete edges intersect other edges to form an angle that satisfies a threshold angle range.

Figure 8:
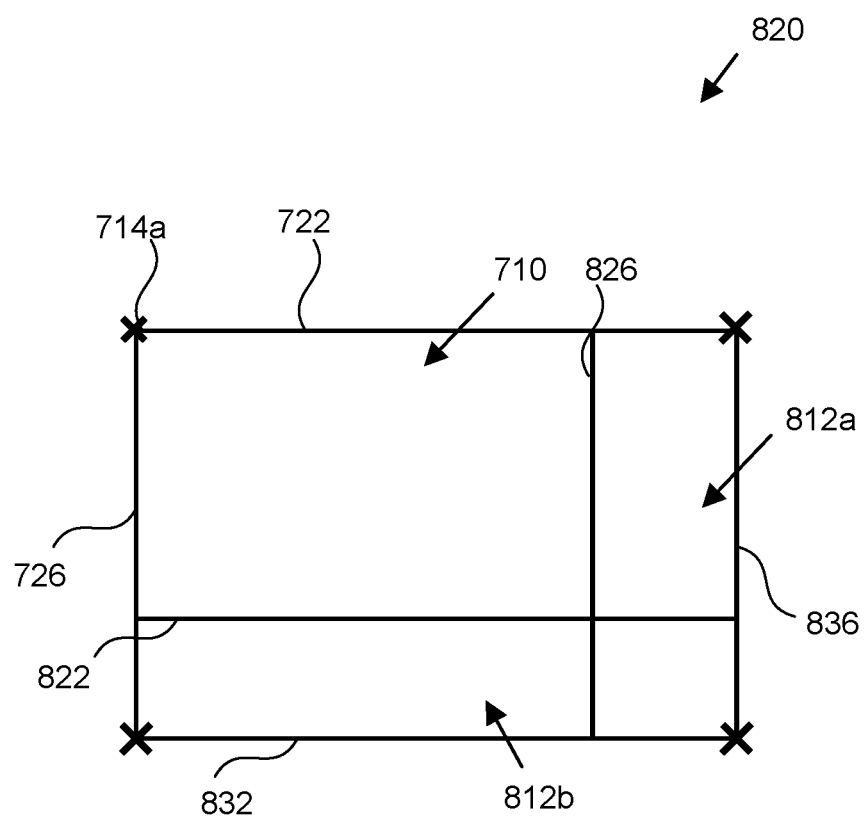
FIG. 8 illustrates an example of a merged MVR region in accordance with some embodiments of the present technology.

As an example of enlarging the initial MVR 710, FIG. 8 illustrates an example of a merged MVR region in accordance with some embodiments of the present technology. In some instances, multiple adjacent surfaces may have essentially the same height and have an edge/horizontal separation between the surfaces. As an illustrative example, the object represented in the point cloud may be a top surface of a box that has two separated rectangular flaps/segments connected by a strip of tape. Due to one or more limitations discussed above, the robotic system 100 may derive the initial MVR 710 to include one flap and extend up to the edge corresponding to the tape or the separation between the flaps/segments. For such instances, the robotic system 100 can derive additional regions and merge/test them with the initial MVR 710 in deriving a verified MVR 820.

As shown in FIG. 8, additional plausible MVR regions 812a-b may be determined based on the initial MVR 710. The additional plausible MVR regions 812a-b may include regions that are correlated to the initial MVR 710. For example, the robotic system 100 can determine the additional plausible MVR regions 812a-b based on analyzing portions of the 2D and/or the 3D images. The robotic system 100 can determine the additional plausible MVR regions 812a-b as locations having a matching visual characteristic (e.g., color, brightness, and/or image pattern) and/or matching depth values that are within the threshold continuity range relative to the initial MVR 710. The robotic system 100 can derive candidate areas as portions of the images determined as being associated with the initial MVR 710.

As an illustrative example, the robotic system 100 can process the MVRs (e.g., initial and expanded MVRs) based on following the first and second exposed edges 722 and 726 (e.g., edges depicted in the 3D image data) away from the exposed outer corner 714a. The robotic system 100 can identify an initial set of opposing edges that include a first initial opposing edge 822 and a second initial opposing edge 826. The robotic system 100 can verify the initial set of opposing edges when the first exposed edge 722 is parallel to the first initial opposing edge 822 and/or the second exposed edge 726 is parallel to the second opposing edge 826. The robotic system 100 can use the verified opposing edges to derive the initial MVR 710.

The robotic system 100 can further determine the additional plausible MVR regions 812a-b based on following the first and second exposed edges 722 and 726 beyond the initial set of opposing edges (e.g., away from the exposed outer corner 714a). The robotic system 100 can identify one or more further opposing edges (e.g., a first edge 832 and/or a second edge 836) that intersect or within a threshold separation distance from the followed edge (e.g., the first exposed edge 722 and/or the second exposed edges 726). The robotic system 100 can verify the further opposing edges similarly as described above, such as when the first edge 832 is parallel to the first exposed edge 722 and/or the first initial opposing edge 822 and/or when the second edge 836 is parallel to the second exposed edge 726 and/or the second initial opposing edge 826.

When the one or more further opposing edges are verified, the robotic system 100 can identify the additional plausible MVR regions. For example, the robotic system 100 can identify a first additional plausible MVR region 812a as an area between the first initial opposing edge 822 and a first of the further opposing edge (e.g., the first edge 832). Also, the robotic system 100 can identify a second additional plausible MVR regions 812b as an area between the second initial opposing edge 826 and a second of the further opposing edge (e.g., the second edge 836).

The robotic system 100 can determine the additional plausible MVR regions 812a-b based on verifying/testing the candidate areas (e.g., combinations of the initial MVR 710 and the first additional plausible MVR region 812a and/or the second additional plausible MVR region 812b). For example, the robotic system 100 can verify that separation distances between candidate areas (e.g., portions of the images determined as being associated with the initial MVR 710) and the initial MVR 710 are less than a predetermined threshold. The robotic system 100 can further test the candidate areas by comparing one or more dimensions thereof to minimum/maximum dimension thresholds described above. The robotic system 100 may determine that the candidate areas as the additional plausible MVR regions 812a-b when the candidate areas are below a minimum threshold (e.g., dimensions of a minimum candidate size). In some embodiments, the robotic system 100 can use the size comparison, the separation distance, and/or the association/similarity between the candidate areas and the initial MVR 710 to calculate a confidence level. The confidence level may represent a likelihood that the candidate areas correspond to the same object as the portions corresponding to the initial MVR 710. The robotic system 100 can compare the confidence level to a predetermine threshold to determine whether the candidate areas should be classified as the additional plausible MVR regions 812a-b or a new instance of the initial MVR 710 (e.g., corresponding to a separate object).

Generating a Verified MVR

The robotic system 100 can derive the verified MVR 820 based on combining the initial MVR 710 and the additional plausible MVRs 812a-b. Accordingly, the robotic system 100 can derive a candidate MVR by enlarging the initial MVR 710 to encompass other nearby regions. Thus, the robotic system 100 can increase the likelihood of accurately estimating a complete surface of the unregistered object via the verified MVR 820.

In some embodiments, the robotic system 100 can derive both the verified MVR 820 and the verified MVR 720 (e.g., a result of reducing the initial MVR 710). According to one or more predetermined processes/equations, the robotic system 100 can calculate confidence values for each of the verified MVRs using one or more of the processing parameters described above. The robotic system 100 can select the verified MVR having the greater confidence value as the final MVR.

Alternatively, the robotic system 100 can derive the initial MVR 710 as the final MVR when tests for smaller and/or larger candidate areas are unsuccessful. For example, if the merged MVR is larger than a maximum candidate size, the merged MVR may be rejected and the verified MVR 820 may include the initial MVR 710 without any of the additional plausible MVRs. Also, if the reduced MVR described in FIG. 7 is less than a minimum candidate size, the verified MVR 710 may include the initial MVR 710. In some embodiments, the robotic system 100 can derive the increased MVR first by enlarging the initial MVR 710. The robotic system 100 can then iteratively reduce the increased MVR as described above to derive the final MVR. The robotic system 100 can use the final verified MVR to register and/or manipulate the unregistered object as described above.

Generating a Minimum Viable Region (MVR) Auto-Registration Pipeline.

Figure 9:
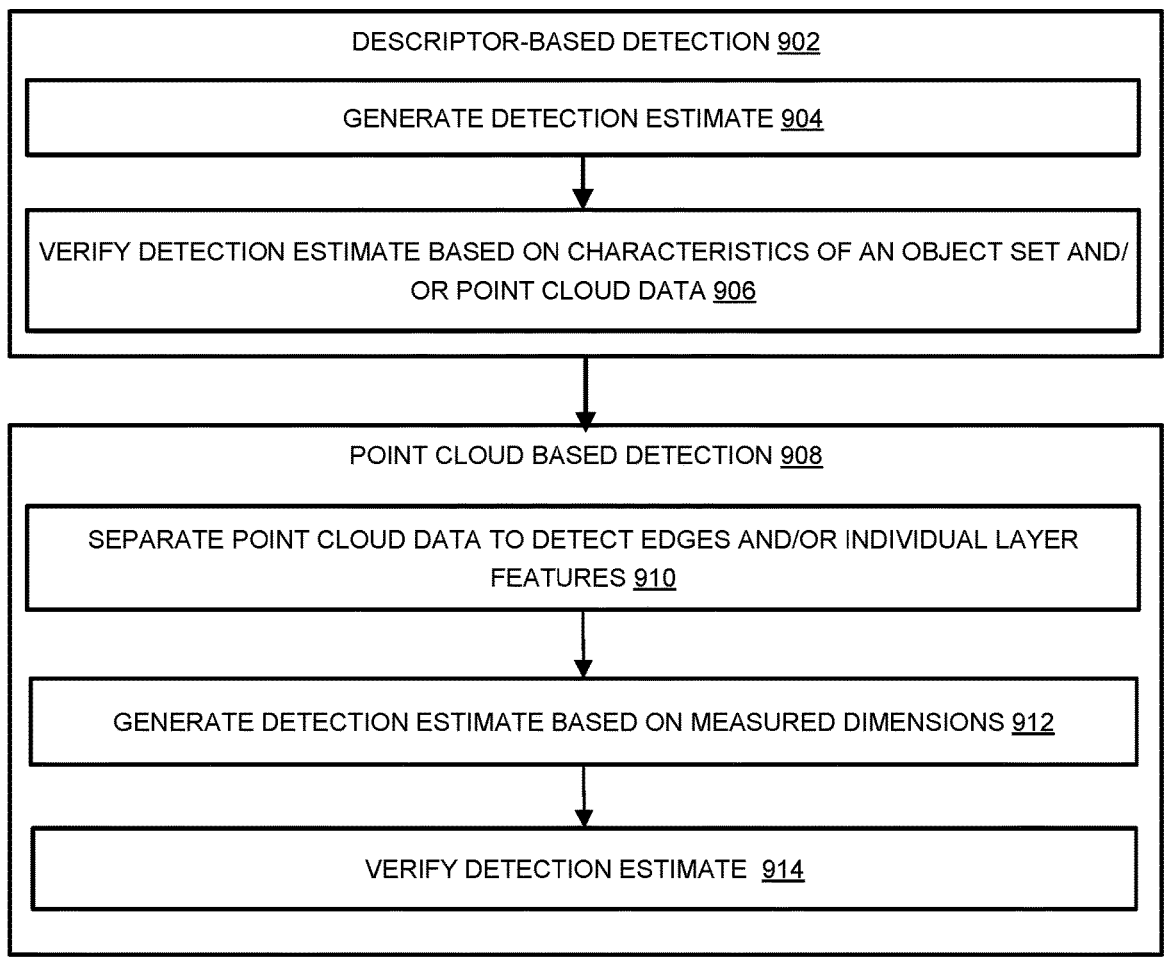
FIG. 9 is a flow diagram of an object recognition process in accordance with some embodiments of the present technology.

FIG. 9 illustrates a flow diagram of an object recognition process 900 for recognizing objects in accordance with some embodiments of the present technology. The process may be based on information available to and/or received at the robotic system 100 of FIG. 1. For example, the robotic system 100 may receive/access 2D and/or 3D image data (via, e.g., the first imaging sensor 212 of FIG. 2) representative of the target stack 210 of FIG. 2 and/or the objects therein (e.g., the registered objects and/or the unrecognized objects). The robotic system 100 may also access predetermined and stored data, such as minimum possible dimensions of the packages 112 of FIG. 1 (also referred to as the min candidate size), maximum possible dimensions of the packages 112 (also referred to as the max candidate size), or a combination thereof. The robotic system 100 can further access and utilize the master data (also referred to as an object set) that includes known or predetermined data/descriptions regarding receivable or expected objects. For example, the object set can include descriptions of traits associated various objects, such as object dimensions, surface images/appearances, patterns, colors, etc. In comparison, the dimensions of individual objects in the target stack 210 (i.e. such as the package 112) may or may not be known by the robotic system 100.

The object recognition process 900 may include a descriptor-based detection process (block 902). In some embodiments, the descriptor-based detection process can include a visual analysis or a computer vision analysis of the 2D image data. Based on the visual analysis, a detection estimate may be generated based on the object set (block 904). The detection estimate can include a hypothesis that a portion in the image data (e.g., the 2D image data) matches or corresponds to an object represented in the object set. As an example, the robotic system 100 can generate the detection estimate based on matching image portions/features, descriptors, and/or other appearance-related data between the object set and the 2D image data.

The descriptor-based detection process may include verifying the hypothesis (block 906). In other words, the robotic system 100 can verify the detection estimate, such as based on characteristics of the registered objects in the object set and/or other sensor data (e.g., 3D image data, such as point cloud data). The robotic system 100 can verify the hypothesis by inspecting/matching other features, local feature descriptors, and/or the 3D image data from a 3D depth sensor. For example, the robotic system 100 can generate the hypothesis based on matching a set of key visual features (e.g., logos, names, largest/brightest features, etc.) to the object set, and verify the hypothesis based on comparing other remaining visual features to the object set. Also, the robotic system 100 can verify the hypothesis based on identifying locations in the 2D image data (i.e., boundaries/edges thereof) that corresponds to a surface corresponding to the hypothesis. For example, the robotic system 100 can calculate associated 2D edge characteristics (e.g., dimensions and locations of edges) corresponding to the identified portion of the 2D image data. The robotic system 100 can verify the hypothesis based on comparing the locations/lengths of the 2D edges for the hypothesized portion of the 2D image data to those represented in the 3D image data (e.g., the point cloud). The robotic system 100 can verify the hypothesis when the characteristics of the 3D edges (e.g., lengths) corresponding to the hypothesized area match those of the hypothesized object represented in the object set. In other words, the robotic system 100 can verify that the hypothesized portion of the 2D image data matches an object represented in the object set when additional aspects, such as location/lengths of the corresponding 3D edges, of the hypothesized portion match those of the objects represented in the object set.

The object registration process 900 can include point-cloud detection (block 908). In some embodiments, the point-cloud detection process can include a 3D analysis of the 3D imaging data from a 3D depth sensor. The point-cloud detection may include separating the point cloud data to identify edges and/or individual layer features (block 910). For example, the robotic system 100 can separate the point cloud data according to depth measurements. As described above, the robotic system 100 can identify groupings of adjacent locations that have depth measurements within a threshold range from each other. Accordingly, the robotic systems 100 can identify the groupings that correspond to the layers and/or the surfaces of the target stack 210. In some embodiments, the robotic system 100 can identify edges/boundaries, surface orientations, and/or discontinuities from the 3D image data. The robotic system 100 can use the identified edges/boundaries, surface orientations, and/or discontinuities to identify the layers that are bounded by the edges, have the same surface orientation, and/or on opposing sides of the discontinuities. Additionally or alternatively, the robotic system 100 can use edges identified in the 2D image data to identify the edges and/or validate the 3D edges.

A detection estimate may be generated based on measured dimensions (block 912). The detection estimate can include a hypothesis that a portion in the 3D image data matches or belongs to an object represented in the object set. For example, the robotic system 100 can generate the detection estimate based on measured dimensions of each individual layer. The robotic system 100 can hypothesize that the identified edge/boundaries of the layers/surfaces correspond to peripheral edges of one or more objects represented in the object set. For example, the robotic system 100 measure or calculate lengths of the edges as described above. The robotic system 100 can generate the detection estimate that includes a portion of the image and/or the corresponding region on the target stack 210 that correspond with or matches a known/registered object in the object set.

The robotic system 100 may verify the detection estimate (block 914). The robotic system 100 can verify the hypothesis by comparing other characteristics of the hypothesized area to those of the registered objects in the object set. For example, when the measured dimensions of the edges forming the layers match corresponding dimensions for one of the registered objects, the robotic system 100 can verify that the object bounded by the compared edges is likely the matching registered object. Alternatively or additionally, the robotic system 100 can verify the hypothesis based on analyzing a portion of the 2D image data corresponding to the hypothesized portion in the 3D image data. For example, the robotic system 100 can determine coordinates/locations for points of the identified 3D edges used for the length comparisons. The robotic system 100 can identify the corresponding locations/portion within the 2D image data of the target stack 210. The robotic system 100 can verify the hypothesis by comparing the identified portion of the 2D image data to the corresponding representations of the surfaces (which can include surface images) stored in the object set. When 2D characteristics (e.g., appearances, such as patterns in the brightness, color, etc.) of the identified portion of the 2D image matches the representation of the surface of the hypothesized registered object, the robotic system 100 can verify that the hypothesis and detect that the corresponding object is present at the location in target stack 210. Thus, the robotic system 100 can identify the known objects (e.g., the recognized objects 312 of FIG. 3B) in the target stack 210.

The object recognition process 900 may be initiated with a non-empty object set. In some embodiments, the object recognition process 900 may begin with any of descriptor-based detection and/or point-cloud based detection, as described with respect to FIG. 9 above. Alternatively or additionally, the object recognition process 900 may implement either the descriptor-based detection or the point-cloud detection without the other or merge the different detection methods.

Figure 10:
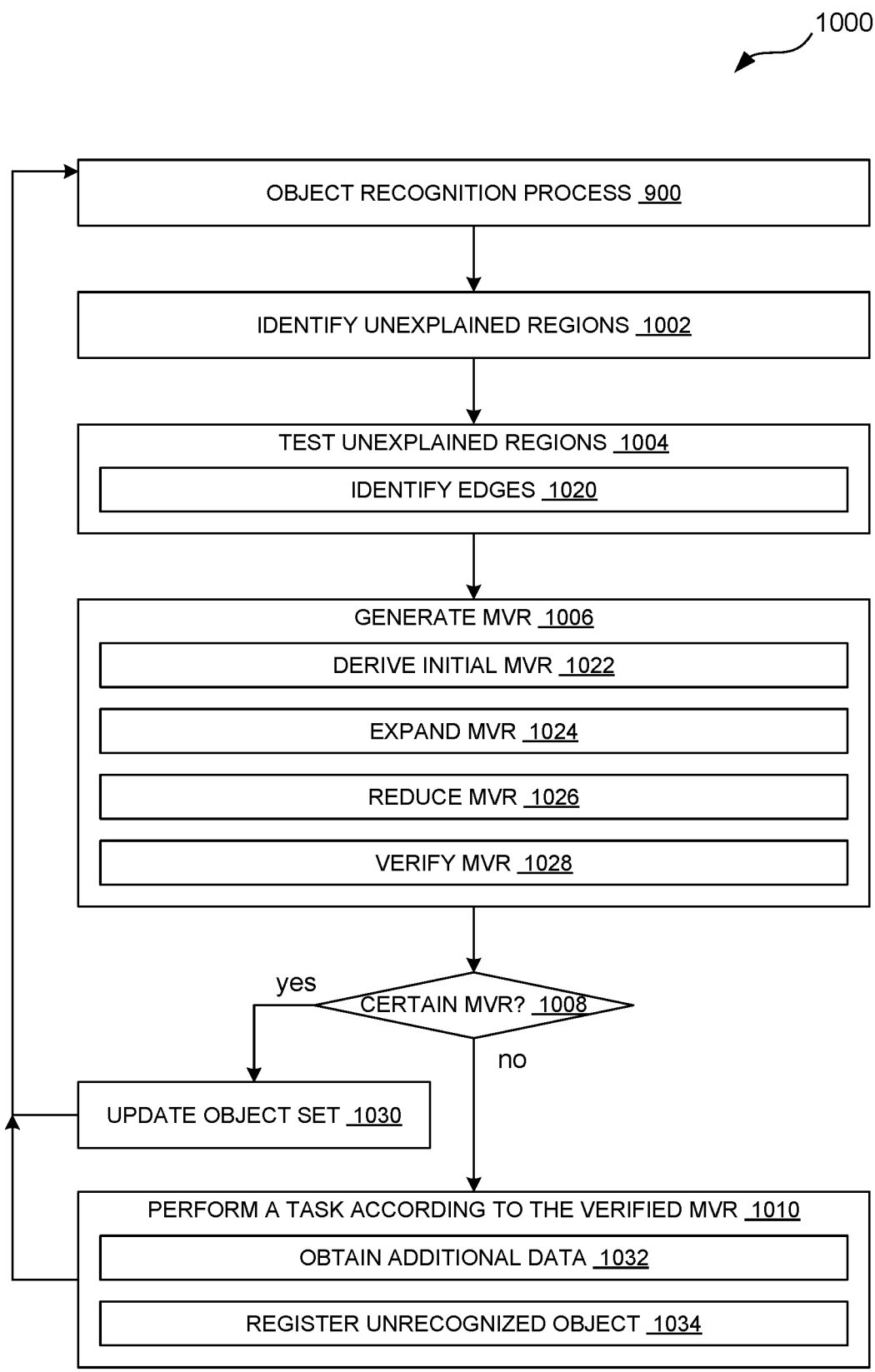
FIG. 10 is a block diagram of a method of operating the robotic system of FIG. 1 in accordance with some embodiments of the present technology.

FIG. 10 is a block diagram of a method 1000 of operating the robotic system 100 of FIG. 1 in accordance with some embodiments of the present technology. The robotic system 100 can implement the method 1000 to process the 2D/3D imaging data generated by and/or received from the first imaging sensor 212 of FIG. 2. For example, the robotic system 100 can implement the method 1000 by executing processor instructions stored on memory devices using one or more processors. Accordingly, the one or more processors can implement the process(es) described herein. The one or more processors can receive data, analyze data, generate results/commands/settings, and/or communicate the commands/settings to operate one or more robotic units.

The method 1000 can include recognizing the known/registered objects (e.g., the recognized objects 312 of FIG. 3B) in the target stack 210 of FIG. 2. According to the method 1000, the robotic system 100 can further process and register the unrecognized objects 314 of FIG. 3B that correspond to unexplained regions in the image data. Thus, the method 1000 can include the object recognition process 900 of FIG. 9.

The robotic system 100 can identify one or more unexplained region remains in the image data (block 1002) after the object recognition process 900. The robotic system 100 can identify the unexplained regions as any portions of the image data of the start location 112 of FIG. 1 (e.g., within horizontal boundaries of a pallet, a cart, a container etc.) that does not return a match (or correspond to) objects represented in the object set (e.g., registration data within the master data). The robotic system 100 can determine that the unexplained region(s) corresponds to one or more unrecognized objects 314 of FIG. 3B.

The robotic system 100 can test the unexplained region(s) (block 1004). The robotic system 100 can test the unexplained region according to its shape and/or its dimensions. Accordingly, the robotic system 100 can identify edges in the image data (e.g., the 2D visual image and/or the 3D point cloud) (block 1020). For example, the robotic system 100 can identify the layers/surfaces in the unexplained region(s) of the image data (e.g., the 2D image and/or the 3D point cloud) based on identifying adjacent locations having depth measures that are within a threshold range from each other. The robotic system 100 can identify the exposed edges as the boundaries of the identified layers where the depth measures deviates outside of the threshold range across horizontally adjacent locations. Also, the robotic system 100 can identify the edges based on analyzing the 2D images according to changes in brightness, colors, etc. In some embodiments, the robotic system 100 can use Sobel filters to identify the edges.

The robotic system 100 can test the unexplained region(s) by comparing the identified edges of the unexplained regions to predetermined shape templates and/or lengths. For example, the robotic system 100 can compare the shape of the unexplained regions (i.e., as defined by a set of connected edges) to the shape templates that represent expected objects (e.g., box and/or cylinder shapes). The robotic system 100 may adjust the dimensions of the shape templates for testing the shapes of the unexplained regions. Additionally or alternatively, the robotic system 100 can calculate the lengths of the identified edges (e.g., edges depicted in the 2D and/or 3D image data) and compare them to predetermined minimum/maximum thresholds.

When the shape and/or the lengths satisfy the predetermined thresholds/conditions, the robotic system 100 may perform object detection using MVR Analysis as described above and generate MVRs (block 1006). The robotic system 100 may derive the initial MVRs using the identified edges/corners (block 1022). For example, the robotic system 100 can select one of the open corners and follow the corresponding open edges to find other qualifying 2D/3D edges (e.g., the estimated edges 424 of FIG. 4B and/or the opposite parallel edges 724, 728 of FIG. 7). The robotic system 100 can derive the initial MVRs when the open edges and the other qualifying edges satisfy a predetermined condition/threshold (e.g., min/max size requirements).

In some embodiments, the robotic system 100 can further process the initial MVRs, such as by expanding (block 1024) and/or reducing (block 1026) the initial MVRs. The robotic system 100 can expand the initial MVRs based on determining the additional plausible MVR regions 812a-b of FIG. 8 as described above. The robotic system 100 can reduce the MVRs (e.g., the initial MVR and/or the expanded MVR) based on starting from a different corner (e.g., a corner that is diagonally opposite the initially selected corner) to find edges. For example, the robotic system 100 can consider other edges (e.g., the incomplete edges 712 of FIG. 7 and/or other 2D/3D edges) for reducing the MVRs.

The robotic system 100 can verify adjusted and/or initial MVRs (block 1028). The robotic system 100 can derive the verified MVR 820 of FIG. 8 as a combination of the initial MVR and the plausible MVR regions when the plausible MVR regions and/or the combinations satisfy a predetermined condition/threshold (e.g., corresponding min/max size requirements). The robotic system 100 can derive the verified MVR 720 of FIG. 7 when the area bounded by the considered edge(s) satisfy a predetermined condition/threshold (e.g., corresponding min/max size requirements). When the considered edges do not satisfy the predetermined conditions/thresholds, the robotic system 100 can derive the verified MVR based on the last valid result. For example, the robotic system 100 can set the initial MVR as the verified MVR when expanded results and reduced results fail tested conditions. Also, the robotic system 100 can produce the verified MVR 820 when subsequent reduction fails the test conditions. In some embodiments, the robotic system 100 can reduce first and then expand the MVRs. Accordingly, the robotic system 100 can produce the verified MVR 720 when subsequent expansion fails the test conditions.

Each of the verified MVRs can represent an estimate of a surface (e.g., a top surface) of one of the unrecognized objects 314 in the unexplained region. In other words, each verified MVR can represent an estimated detection representing one object within the unexplained regions.

The robotic system 100 can further analyze the MVRs to determine whether they are certain or uncertain (block 1008). For example, the robotic system 100 can determine a number of open corners (e.g., 3D corners) included in and/or utilized to derive the MVRs and classify the MVRs accordingly. The robotic system 100 can classify/determine a classification for the MVRs based on comparing the number of associated open corners to a predetermined threshold. As an illustrative example, the robotic system 100 may determine uncertain MVRs as the initial and/or verified MVRs that include or are derived using two or fewer open 3D corners. Also, the robotic system 100 may determine certain MVRs as initial and/or verified MVRs that include or are derived using three or more open 3D corners.

In some embodiments, the robotic system 100 can determine the certainty of the initial MVR (e.g., before blocks 1024-1028). When the initial MVR is a certain MVR, the robotic system 100 may bypass the operations described above for blocks 1024-1028. The robotic system 100 can implement the processes described above for blocks 1024-1028 when the initial MVR is the uncertain MVR. In other embodiments, the robotic system 100 can determine the certainty of the verified MVR after expanding, reducing, and/or verifying the processed MVRs.

The robotic system 100 can update the object set when the MVR is certain (block 1030). In some embodiments, the robotic system can update the object set with the MVR according to the classification for the MVRs. For example, using the certain MVRs, the robotic system 100 may detect an object, such as by determining/concluding that the certain MVRs each correspond to a single detected object (e.g., one instance of the unrecognized objects 314). Accordingly, the robotic system 100 can detect and/or register the certain MVR directly (e.g., without further adjusting, testing, and/or verifying the MVRs), such as by storing the certain MVR (e.g., the visual image and/or the corresponding dimensions) in the object set. Using the updated object set (i.e. the object set updated with the certain MVR), the robotic system 100 may reimplement the object recognition process 900 as represented by the feedback loop.

When the MVR is uncertain, the robotic system 100 can perform a task according to the verified MVR (block 1010). The robotic system 100 can use the verified MVR to derive the grip location 420 of FIG. 4B. For example, the robotic system 100 can derive the grip location 420 aligned with or abutting the exposed corner of the verified MVR. Also, the robotic system 100 may derive the grip location 420 overlapping a middle portion of the verified MVR. Based on the grip location 420, the robotic system 100 can derive commands, settings, and/or motions plans to operate the robotic arm 202 of FIG. 2 and/or the end-effector 204 of FIG. 2 to grip and transfer the object. For the task, the robotic system 100 can transfer the object to the task location 116 of FIG. 1. Also, the robotic system 100 can further place the object at one or more specific locations, such as to present the object to one or more sensors and/or to place the object about one or more lines/planes, during the transfer.

The robotic system 100 may obtain additional data about the object during its transfer (block 1032). For example, the robotic system 100 can grip the object and perform an initial displacement (e.g., raise and/or horizontally displace by a predetermined distance). The robotic system 100 can generate one or more updated 2D/3D image data (via, e.g., the first image sensor 212) after the initial displacement. Based on the increased separation between the gripped object and the surrounding objects, the robotic system 100 can analyze the updated 2D/3D image data to rederive the edges, the MVR, and/or the object dimensions. Also, the robotic system 100 can calculate a height of the object according to one or more crossing sensors (not shown). The robotic system 100 can determine the height of the end effector 204 when a bottom portion of the transferred object enters/exits a laterally-oriented sensing line/plane associated with the crossing sensors (e.g., sensors configured to detect disruptions in an optical signal). The robotic system 100 can calculate the height based on the height of the end effector and a known height of the sensing line/plane. Also, the robotic system 100 can obtain peripheral images, identifier values/locations, weight, and/or other physical descriptions of the object during transfer.

The robotic system 100 can register the transferred unrecognized object (block 1034). The robotic system 100 can register the object based on storing the additional data and/or the verified MVR in the object set as described above. The robotic system 100 can use the updated object set to further recognize other objects as illustrated by the feedback loop to the object recognition process 900.

In implementing the processes corresponding to block 1010, the robotic system 100 may return the uncertain MVRs to a planning module (not shown) together with the detected objects (e.g., results from the object recognition process 900) and/or the newly registered detected objects (e.g., the certain MVRs). The planning module can derive motion plans to manipulate/transfer the recognized objects, the detected objects (e.g., the unrecognized objects corresponding to the certain MVRs), and/or other unrecognized objects. The robotic system 100 can further obtain the additional information (e.g., object heights, identifier data, profile images, etc.) during transfer of the unrecognized objects, and use the obtained additional information to update the registration data in the object set. The robotic system 100 can use the obtained additional information to register the unrecognized objects and/or to derive the final verified MVRs.

In some embodiments, the robotic system 100 can process the unexplained regions and generate all initial/verified MVRs therein. According to an iterative implementation of the method 1000, the robotic system 100 can compare the unexplained regions to the object set to first determine and register the certain MVRs amongst the generated MVRs. Using the updated object set (e.g., the certain MVRs), the robotic system 100 can reimplement the object recognition process 900 and detect objects in the unexplained region that correspond to the certain MVRs. The robotic system 100 can update the unexplained region by identifying regions therein that match the certain MVRs used to update the object set, thereby detecting corresponding objects. The robotic system 100 can finish updating the unexplained region by removing the portions that correspond to/match the certain MVRs from the unexplained region. The robotic system 100 can repeat this iterative process until the resulting unexplained regions no longer include the certain MVRs. For the uncertain MVRs, the robotic system 100 can derive/use the corresponding verified MVRs from the unexplained region to manipulate the unrecognized objects therein. The robotic system 100 may further obtain the additional information while manipulating the unrecognized objects as described above. The robotic system 100 may update the object set with the verified MVRs and/or the additional information and continue the object recognition process 900 to recognize other objects matching the transferred objects and repeat the iterative process. The robotic system 100 can update the unexplained region by identifying regions therein that match the verified MVRs for the transferred objects, thereby detecting the corresponding objects. The robotic system 100 can finish updating the unexplained region by removing portions from the unexplained region that match the verified MVRs for the transferred objects. The robotic system 100 can process the updated unexplained region to derive and verify a subsequent MVR that corresponds to a subsequent type/instance of the unrecognized objects.

Additionally or alternatively, the robotic system 100 may determine the recognized objects and derive all MVRs and then plan the transfer of the objects. In other embodiments, the robotic system 100 can derive or update the MVRs based on first transferring the recognized objects and/or the objects corresponding to certain MVRs. Accordingly, the robotic system 100 can increase the likelihood of exposing additional 3D edges/corners of the unrecognized objects. The increased the likelihood of exposing the additional 3D edges/corners can increase the likelihood of identifying the certain MVRs, which can provide increased accuracy in detecting the objects and the derived MVRs. Further, the increased accuracy can provide increased efficiency by reducing/eliminating processing steps and/or by reducing loss pieces and/or collisions caused by inaccurate object detection.

The robotic system 100 can use the embodiments described herein to autonomously populate the object set. In other words, the robotic system 100 can start from an empty set of the object set that includes no registration data. Under such conditions, the robotic system 100 may implement the method 1000 starting from block 1002 and identify the entirety of the received image data as an unexplained region. Since no registration data exists, the robotic system 100 can register the objects as they are processed (e.g., transferred from the starting location 114 to the task location 116) with little to no human operator input. Accordingly, the robotic system 100 can begin deriving the MVRs without implementing the object recognition process 900 and store a subset of the derived MVRs (e.g., the certain MVRs) in the object set. The robotic system 100 can iteratively implement the method 1000 as described above to register the objects. For example, the robotic system 100 can detect a first set of objects represented in the unexplained region based on matching corresponding portions therein to the subset of the derived MVRs stored in the object set. The robotic system 100 can remove the matching portions from the unexplained region, thereby updating it according to detection of the first set of objects. The robotic system 100 can process the updated unexplained region to derive a new/subsequent set of MVRs (e.g., another set of the certain MVRs and/or other verified MVRs) for registering other objects in the updated unexplained region.

Example Processing System

Figure 11:
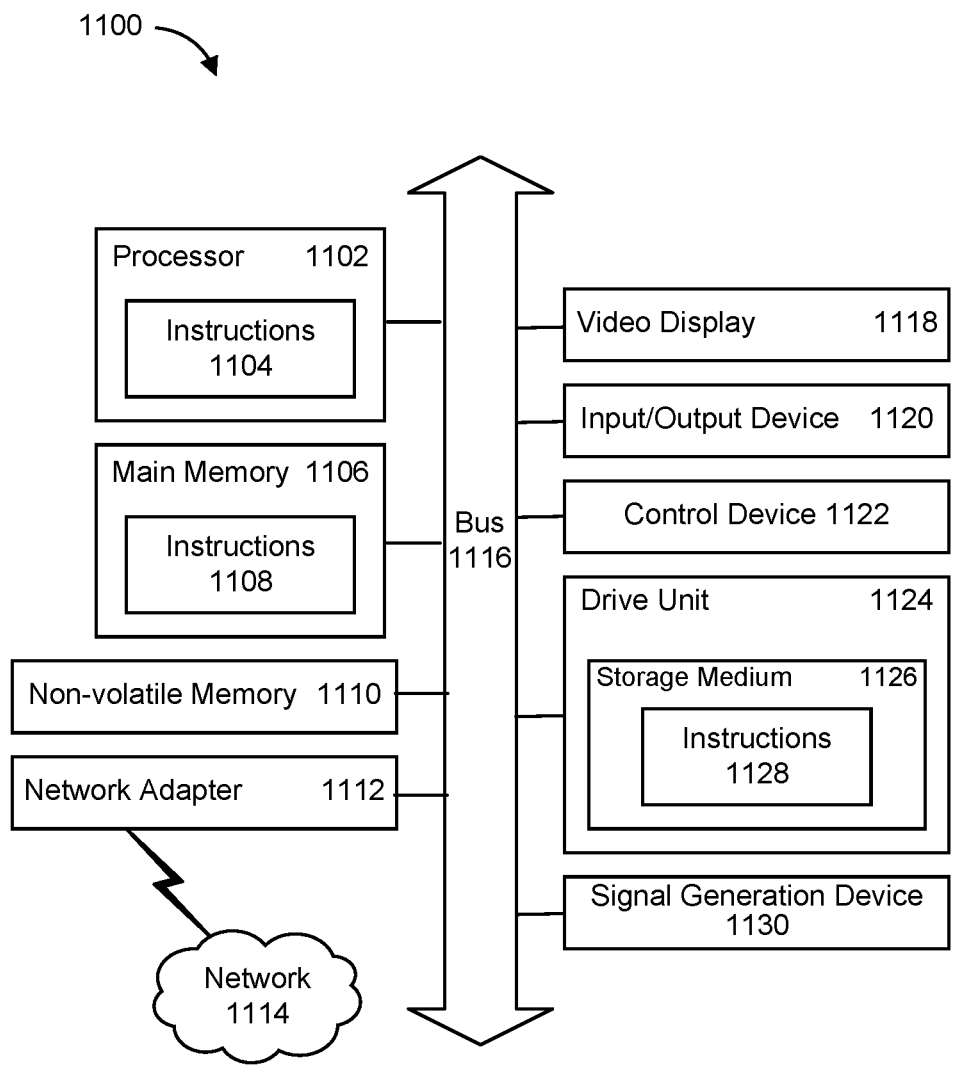
FIG. 11 is a block diagram that illustrates an example of a processing system in which at least some operations described herein can be implemented.

FIG. 11 is a block diagram illustrating an example of a processing system 1100 in which at least some operations described herein can be implemented. As shown in FIG. 11, the processing system 1100 may include one or more central processing units ("processors") 1102, main memory 1106, non-volatile memory 1110, network adapter 1112 (e.g., network interfaces), video display 1118, input/output devices 1120, control device 1122 (e.g., keyboard and pointing devices), drive unit 1124 including a storage medium 1126, and signal generation device 1130 that are communicatively connected to a bus 1116. The bus 1116 is illustrated as an abstraction that represents any one or more separate physical buses, point to point connections, or both connected by appropriate bridges, adapters, or controllers. The bus 1116, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the processing system 1100 operates as part of a user device, although the processing system 1100 may also be connected (e.g., wired or wirelessly) to the user device. In a networked deployment, the processing system 1100 may operate in the capacity of a server or a client machine in a client-server network environment, or as a peer machine in a peer-to-peer (or distributed) network environment.

The processing system 1100 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 1100.

While the main memory 1106, non-volatile memory 1110, and storage medium 1126 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1128. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1104, 1108, 1128) set at various times in various memory and storage devices in a computer, and that, when read and executed by one or more processing units or processors 1102, cause the processing system 1100 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 1110, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 1112 enables the processing system 1100 to mediate data in a network 1114 with an entity that is external to the processing system 1100 through any known and/or convenient communications protocol supported by the processing system 1100 and the external entity. The network adapter 1112 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1112 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

From the foregoing, it will be appreciated that specific embodiments of the invention have been described herein for purposes of illustration, but that various modifications may be made without deviating from the scope of the invention. Accordingly, the invention is not limited except as by the appended claims.

EXAMPLES

A method may comprise: receiving image data representative of one or more unrecognized objects; identifying an unexplained region of the image data based on a comparison with an object set of registered objects; identifying one or more layers within the unexplained region; identifying exposed edges representing boundaries of the one or more layers where depth measures deviate across horizontally adjacent locations; identifying one or more exposed corners based on the exposed edges; deriving a minimum viable region (MVR) based on the identified exposed edges and the exposed corners; determining a number of the exposed corners associated with the derived MVR; detecting an unrecognized object according to the MVR and the number of exposed corners; and registering the unrecognized object based on updating the object set to include the MVR and/or a processing result thereof.

The method may further comprise iteratively updating and analyzing the unexplained region according to the updated object set based on: comparing the unexplained region with the updated object set; identifying a portion within the unexplained region that matches the MVR and/or the processing result thereof used to update the object set; detecting an object according to the portion that matches the MVR and/or the processing result thereof; and updating the unexplained region by removing the portion that matches the MVR and/or the processing result thereof. The object set may be an empty set for an initial iteration; the unexplained region may include the image data, a portion thereof, or a combination thereof for the initial iteration; and registering the unrecognized object may include autonomously populating the object set while implementing tasks involving the unrecognized objects. In some embodiments, detecting the unrecognized object may include detecting the unrecognized object directly when the number of the exposed corners exceed a predetermined threshold; and registering the recognized object may include storing the MVR in the object set directly when the exposed corners exceed the predetermined threshold. Also, the predetermined threshold may be two.

In one or more embodiments, the object set may represent one or more physical aspects of the registered objects; each of the one or more layers may include a set of laterally adjacent points having depth measures within a threshold range from each other in the image data; the depth measures may deviate outside a threshold range across horizontally adjacent locations; each of the exposed corners may correspond to a junction between a set of the exposed edges that are not horizontally adjacent to another surface or object; the MVR may represent an estimate of a surface for an unregistered object represented in the unexplained region; the one or more unrecognized objects may be located in a target stack; the image data may include two-dimensional (2D) image data and/or three-dimensional (3D) image data; and/or the MVR and/or the processing result thereof may represent one or more physical attributes of one of the unrecognized objects.

A robotic system may comprise: at least one processor; and at least one memory device connected to the at least one processor and having stored thereon instructions executable by the processor for: receiving one or more image data representative of one or more unrecognized objects; deriving a minimum viable region (MVR) based on identifying one or more exposed corners in the one or more image data; updating an object set of previously registered objects with the MVR and/or a processing result thereof based on a number of the exposed corners associated with the MVR; and recognizing another object based on the updated object set.

The at least one memory device may further include instructions for: determining the MVR as a certain MVR based on comparing the number of the exposed corners to a predetermined threshold; determining the MVR as the certain MVR when the MVR is associated with three or more of the exposed corners; updating the object set with the MVR and/or a processing result thereof directly based on the determination of the MVR as the certain MVR and without further updating or adjusting the MVR; identifying an unexplained region of the image data that does not return a match with objects represented in the object set; deriving the MVR based on the unexplained region, wherein the certain MVR is within the unexplained region; removing a portion of the unexplained region that matches the certain MVR for further object recognition and/or manipulation; implementing operations for transferring an unrecognized object that corresponds to the certain MVR away from a start location; deriving a subsequent MVR based on an updated unexplained region after implementing the operations for transferring the unrecognized object, wherein the subsequent MVR represents a further unrecognized object at the start location and is represented in the updated unexplained region; and/or updating the object set with the subsequent MVR and/or a processing result thereof.

In some embodiments, the at least one memory device may further include instructions for: determining the MVR as an uncertain MVR when the MVR is associated with two or fewer of the exposed corners; and updating the object set with the MVR and/or a processing result thereof based on further analyzing the uncertain MVR and/or manipulating one or more of the unrecognized objects. Also, the at least one memory device may further include instructions for: detecting one or more recognized objects based on comparing the image data with the object set; identifying an unexplained region of the image data that does not return a match with the object set; deriving the MVR within the unexplained region based on identifying the one or more exposed corners in the unexplained region of the image data, wherein the MVR represents an estimate of a surface of one of the unrecognized objects; implementing operations for transferring the one or more recognized objects away from a start location; updating the MVR after implementing the operation to transfer the one or more recognized objects; and/or updating the object set with the updated MVR and/or a processing result thereof.

A tangible, non-transient computer-readable medium having processor instructions stored thereon that, when executed by a processor, cause the processor to implement a method, the method may comprise: iteratively analyzing one or more received image data that represent registered and/or unrecognized objects by: deriving one or more minimum viable regions (MVRs) based on identifying one or more exposed corners in the received image data; determining a classification for each of the MVRs based on a number of the exposed corners associated with the corresponding MVR; updating an object set of previously registered objects with the MVRs and/or a processing result thereof according to the corresponding classification; and recognizing other objects using the updated object set.

The one or more received image data may include two-dimensional (2D) image data and three-dimensional (3D) image data both representing the registered and/or unrecognized objects from one imaging location. Also, the method may further comprise: generating a detection estimate based on comparing the 2D image data to the object set; and verifying the detection estimate based on the 3D image data. Generating the detection estimate may include generating the detection estimate based on matching a portion of the 2D image data to a surface image of an object represented in the object set; verifying the detection estimate includes verifying the detection estimate based on: identifying a portion in the 3D image data corresponding to the detection estimate; calculating lengths for 3D edges in the identified portion of the 3D image data; and verifying the detection estimate when the lengths of the 3D edges match those of the object represented in the object set.

In some embodiments, the one or more received image data may include two-dimensional (2D) image data and three-dimensional (3D) image data both representing the registered and/or unrecognized objects from one imaging location. Also, the method may further comprise: generating a detection estimate based on comparing the 3D image data to the object set; and verifying the detection estimate based on the 2D image data. Generating the detection estimate may include generating the detection estimate based on: identifying a layer within the 3D image data, wherein the layer includes a set of horizontally adjacent locations having depth measures within a threshold range of each other, identifying edges of the layer, wherein the edges represent locations where the depth measures deviate outside of the threshold range across horizontally adjacent locations, calculating lengths of the edges, and matching the edge lengths to dimensions of an object represented in the object set. Verifying the detection estimate may include verifying the detection estimate based on: identifying a portion in the 2D image data corresponding to the detection estimate, identifying 2D characteristics in the identified portion of the 2D image data, and verifying the detection estimate when the 2D characteristics match corresponding characteristics of an image of the one of the registered objects represented in the object set.

The method may further comprise iteratively building the object set from an empty set based on analyzing the one or more received image data by: identifying the one or more received image data or a portion thereof as an unexplained region when the object set includes no registration data of any objects; deriving the one or more MVRs from the unexplained region; storing at least a subset of the one or more MVRs in the object set according to the corresponding classifications; detecting a first set of objects represented in the received image data based on matching portions of the received image data to the one or more MVRs stored in the object set; updating the unexplained region by removing the matched portions; and deriving a new set of MVRs based on the updated unexplained region for registering a second set of objects represented in the received image data.

What is claimed is:

1. A method for detecting unrecognized objects in a target stack, the method comprising:

receiving image data representative of one or more unrecognized objects in the target stack;
identifying an unexplained region of the image data based on a comparison with an object set of registered objects;
identifying one or more layers corresponding to objects in the target stack within the unexplained region;
identifying exposed edges representing boundaries of the one or more layers corresponding to objects in the target stack, wherein depth measures deviate across horizontally adjacent locations;
identifying one or more exposed corners of the one or more layers corresponding to objects in the target stack based on the exposed edges;
deriving a minimum viable region (MVR) based on the exposed edges and the one or more exposed corners;
determining a number of the one or more exposed corners associated with the derived MVR;
detecting an unrecognized object according to the MVR and the number of the one or more exposed corners associated with the derived MVR; and
registering the unrecognized object by updating the object set to include at least one of the MVR and a processing result thereof.

2. The method of claim 1, further comprising iteratively updating and analyzing the unexplained region according to the updated object set by:

comparing the unexplained region with the updated object set;
identifying a portion within the unexplained region that matches the at least one of the MVR and the processing result thereof used to update the object set;
detecting an object according to the portion that matches the at least one of the MVR and the processing result thereof; and
updating the unexplained region by removing the portion that matches the at least one of the MVR and the processing result thereof.

3. The method of claim 2, wherein:

the object set is an empty set for an initial iteration;
the unexplained region includes the image data, a portion thereof, or a combination thereof for the initial iteration; and
registering the unrecognized object includes autonomously populating the object set while implementing tasks involving the unrecognized objects.

4. The method of claim 1, wherein:

detecting the unrecognized object includes detecting the unrecognized object directly when the number of the exposed corners exceed a predetermined threshold; and
registering the recognized object includes storing the MVR in the object set directly when the exposed corners of the one or more layers of the target stack exceed the predetermined threshold.

5. The method of claim 4, wherein the predetermined threshold is two.

6. A robotic system, comprising:

at least one processor; and
at least one memory device connected to the at least one processor and having stored thereon instructions executable by the processor for:
receiving one or more image data representative of one or more unrecognized objects in a target stack of objects;
deriving a minimum viable region (MVR) based on identifying one or more exposed corners of objects in the one or more image data;

updating an object set of previously registered objects with at least one of the MVR and a processing result thereof based on a number of the exposed corners of objects associated with the MVR; and recognizing another object based on the updated object set.

7. The robotic system of claim 6, wherein the at least one memory device includes instructions for determining the MVR as a certain MVR based on comparing the number of the exposed corners to a predetermined threshold.

8. The robotic system of claim 7, wherein the at least one memory device includes instructions for determining the MVR as the certain MVR when the MVR is associated with three or more of the exposed corners.

9. The robotic system of claim 8, wherein the at least one memory device includes instructions for updating the object set with at least one of the MVR and a processing result thereof directly based on the determination of the MVR as the certain MVR and without further updating or adjusting the MVR.

10. The robotic system of claim 9, wherein the at least one memory device includes instructions for:
   identifying an unexplained region of the image data that does not return a match with objects represented in the object set;
   deriving the MVR based on the unexplained region, wherein the certain MVR is within the unexplained region; and
   removing a portion of the unexplained region that matches the certain MVR for at least one of further object recognition and object manipulation.

11. The robotic system of claim 10, wherein the at least one memory device includes instructions for:
   implementing operations for transferring an unrecognized object that corresponds to the certain MVR away from a start location;
   deriving a subsequent MVR based on an updated unexplained region after implementing the operations for transferring the unrecognized object, wherein the subsequent MVR represents a further unrecognized object at the start location and is represented in the updated unexplained region; and
   updating the object set with at least one of the subsequent MVR and a processing result thereof.

12. The robotic system of claim 6, wherein the at least one memory device includes instructions for:
   determining the MVR as an uncertain MVR when the MVR is associated with two or fewer of the exposed corners; and
   updating the object set with at least one of the MVR and a processing result thereof based on at least one of further analyzing the uncertain MVR and manipulating one or more of the unrecognized objects.

13. The robotic system of claim 6, wherein the at least one memory device includes instructions for:
   detecting one or more recognized objects based on comparing the image data with the object set;
   identifying an unexplained region of the image data that does not return a match with the object set; and
   deriving the MVR within the unexplained region based on identifying the one or more exposed corners in the unexplained region of the image data, wherein the MVR represents an estimate of a surface of one of the unrecognized objects.

14. The robotic system of claim 13, wherein the at least one memory device includes instructions for:
   implementing operations for transferring the one or more recognized objects away from a start location;
   updating the MVR after implementing the operation to transfer the one or more recognized objects; and
   updating the object set with at least one of the updated MVR and a processing result thereof.

15. A tangible, non-transitory computer-readable storage medium having processor instructions stored thereon that, when executed by a processor, cause the processor to implement a method, the method comprising:
   iteratively analyzing one or more received image data that represent at least one of registered objects and unrecognized objects of a target stack by:
      deriving one or more minimum viable regions (MVRs) based on identifying one or more exposed corners of objects in the received image data;
      determining a classification for each of the MVRs based on a number of the exposed corners associated with the corresponding MVR;
      updating an object set of previously registered objects with at least one of the MVRs and a processing result thereof according to the corresponding classification; and
   recognizing other objects in the target stack using the updated object set.

16. The non-transitory computer-readable storage medium of claim 15, wherein:
   the one or more received image data include two-dimensional (2D) image data and three-dimensional (3D) image data both representing at least one of the registered objects and unrecognized objects from one imaging location;
   the method further comprises:
      generating a detection estimate based on comparing the 2D image data to the object set; and
      verifying the detection estimate based on the 3D image data.

17. The non-transitory computer-readable storage medium of claim 16, wherein:
   generating the detection estimate includes generating the detection estimate based on matching a portion of the 2D image data to a surface image of an object represented in the object set;
   verifying the detection estimate includes verifying the detection estimate based on:
      identifying a portion in the 3D image data corresponding to the detection estimate;
      calculating lengths for 3D edges in the identified portion of the 3D image data; and
      verifying the detection estimate when the lengths of the 3D edges match those of the object represented in the object set.

18. The non-transitory computer-readable storage medium of claim 15, wherein:
   the one or more received image data include two-dimensional (2D) image data and three-dimensional (3D) image data both representing at least one of the registered objects and unrecognized objects from one imaging location;
   the method further comprises:
      generating a detection estimate based on comparing the 3D image data to the object set; and
      verifying the detection estimate based on the 2D image data.

19. The non-transitory computer-readable storage medium of claim 18, wherein:

generating the detection estimate includes generating the detection estimate based on:
  identifying a layer corresponding to objects within the 3D image data, wherein the layer includes a set of horizontally adjacent locations having depth measures within a threshold range of each other,
  identifying edges of the layer, wherein the edges represent locations where the depth measures deviate outside of the threshold range across horizontally adjacent locations,
  calculating lengths of the edges, and
  matching the edge lengths to dimensions of an object represented in the object set; and
verifying the detection estimate includes verifying the detection estimate based on:
  identifying a portion in the 2D image data corresponding to the detection estimate,
  identifying 2D characteristics in the identified portion of the 2D image data, and
  verifying the detection estimate when the 2D characteristics match corresponding characteristics of an image of the one of the registered objects represented in the object set.

20. The non-transitory computer-readable storage medium of claim 15, wherein the method further comprises iteratively building the object set from an empty set based on analyzing the one or more received image data by:
  identifying the one or more received image data or a portion thereof as an unexplained region when the object set includes no registration data of any objects;
  deriving the one or more MVRs from the unexplained region;
  storing at least a subset of the one or more MVRs in the object set according to the corresponding classifications;
  detecting a first set of objects represented in the received image data based on matching portions of the received image data to the one or more MVRs stored in the object set;
  updating the unexplained region by removing the matched portions; and
  deriving a new set of MVRs based on the updated unexplained region for registering a second set of objects represented in the received image data.

* * * * *